United States Patent
Nakahara

(10) Patent No.: US 9,628,642 B2
(45) Date of Patent: Apr. 18, 2017

(54) INFORMATION PROCESSING SYSTEM, LICENSE SERVER, COMMUNICATION RELAY DEVICE, NON-TRANSITORY READABLE RECORDING MEDIUM AND DATA RESTORATION METHOD

(71) Applicant: Konica Minolta, Inc., Chiyoda-ku, Tokyo (JP)

(72) Inventor: Kei Nakahara, Suita (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/849,245

(22) Filed: Sep. 9, 2015

(65) Prior Publication Data
US 2016/0072969 A1   Mar. 10, 2016

(30) Foreign Application Priority Data

Sep. 10, 2014   (JP) .................................. 2014-183990

(51) Int. Cl.
*H04N 1/00* (2006.01)
*H04N 1/32* (2006.01)
(Continued)

(52) U.S. Cl.
CPC ......... *H04N 1/00344* (2013.01); *H04L 25/20* (2013.01); *H04N 1/00244* (2013.01);
(Continued)

(58) Field of Classification Search
None
See application file for complete search history.

(56) References Cited

U.S. PATENT DOCUMENTS

| 2003/0028592 | A1* | 2/2003 | Ooho | G06F 11/1469 709/203 |
| 2004/0205201 | A1* | 10/2004 | Katsube | H04L 41/0803 709/229 |

(Continued)

FOREIGN PATENT DOCUMENTS

| JP | 2006-107468 A | 4/2008 |
| JP | 2008-236091 A | 10/2008 |
| JP | 2008-236092 A | 10/2008 |

*Primary Examiner* — Beniyam Menberu
(74) *Attorney, Agent, or Firm* — Buchanan Ingersoll & Rooney PC

(57) ABSTRACT

An information processing system comprises: an image processing device; an application server that provides with an application service for cooperation with the image processing device; a communication relay device that relays communications between the image processing device and the application server; a license server managing the communication relay server; and a backup server. The communication relay device includes: a relay information generating part that generates relay information to relay the communications; a storage part in which the relay information is stored; a communication relaying part that relays the communications based on the relay information; a backup part that sends the relay information to the backup server; an identification information transmission part that reads identification information and sends the read identification information to the license server; and a setting applying part that obtains the relay information from the backup server and stores the obtained relay information in the storage part.

24 Claims, 19 Drawing Sheets

(51) Int. Cl.
*H04N 1/327* (2006.01)
*G06F 3/12* (2006.01)
*G06K 15/02* (2006.01)
*H04L 25/20* (2006.01)

(52) U.S. Cl.
CPC ..... *H04N 1/00278* (2013.01); *H04N 1/00347* (2013.01); *H04N 1/32518* (2013.01); *H04N 1/32523* (2013.01); *H04N 1/32771* (2013.01); *H04N 2201/0013* (2013.01); *H04N 2201/0039* (2013.01); *H04N 2201/0094* (2013.01)

(56) References Cited

U.S. PATENT DOCUMENTS

| | | | |
|---|---|---|---|
| 2008/0155215 A1* | 6/2008 | Matsuzaki | G06F 11/1456 711/162 |
| 2008/0226081 A1 | 9/2008 | Terao | |
| 2008/0301771 A1* | 12/2008 | Kawai | G06F 21/125 726/2 |
| 2009/0228982 A1 | 9/2009 | Kobayashi | |
| 2012/0239821 A1* | 9/2012 | Hozumi | H04L 67/1008 709/238 |
| 2013/0070780 A1* | 3/2013 | Hozumi | H04B 7/15542 370/437 |

* cited by examiner

INFORMATION PROCESSING SYSTEM 1

FIG. 5

MANAGEMENT INFORMATION 32

| No. | RELAY TARGET DEVICE | IP ADDRESS | MAC ADDRESS |
|---|---|---|---|
| 1 | M F P 1 | 192.128.10.3 | 04-20-0A-10-0A-A1 |
| 2 | M F P 2 | 192.128.10.5 | 03-25-2C-41-19-A3 |

FIG. 6

RELAY INFORMATION 33

| No. | SERVER CONNECTING INFORMATION | | LAN CONNECTING INFORMATION |
|---|---|---|---|
| | URL | PORT | PORT |
| 1 | http://server01/application1/··· | 10080 | 250 |
| 2 | http://server02/application2/··· | 18080 | 120 |

FIG. 8

LICENSE MANAGEMENT INFORMATION  48

| No. | IDENTIFICATION INFORMATION | VALID FLAG | REPLACEMENT FLAG |
|---|---|---|---|
| 1 | 10012345 | YES | — |
| 2 | 21005648 | YES | YES |

FIG. 17

LICENSE MANAGEMENT INFORMATION 48

| No. | IDENTIFICATION INFORMATION | RELAY TARGET DEVICE INFORMATION | | NETWORK INFORMATION | |
|---|---|---|---|---|---|
| | | IP ADDRESS | MAC ADDRESS | NETWORK ADDRESS | DEFAULT GATEWAY |
| 1 | 10012345 | 192.128.10.3 | 04-20-0A-10-0A-A1 | 192.128.10 | NA |
| | | 192.128.10.5 | 03-25-2C-41-19-A3 | 192.128.10 | NA |
| 2 | 21005648 | 192.128.10.7 | 08-43-89-A2-11-34 | 192.128.10 | NA |
| | | 192.128.10.9 | 53-22-4C-A3-63-C3 | 192.128.10 | NA |

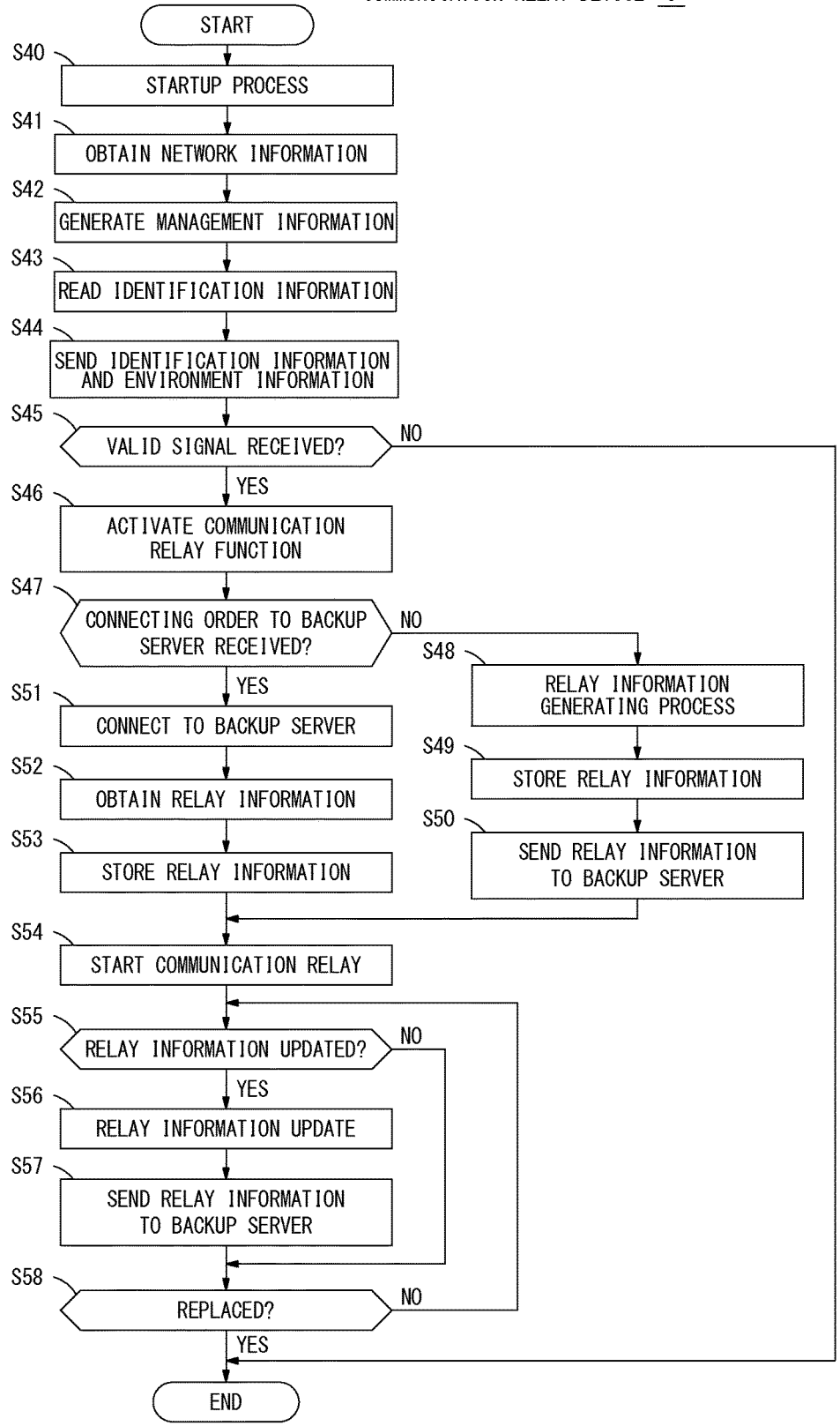

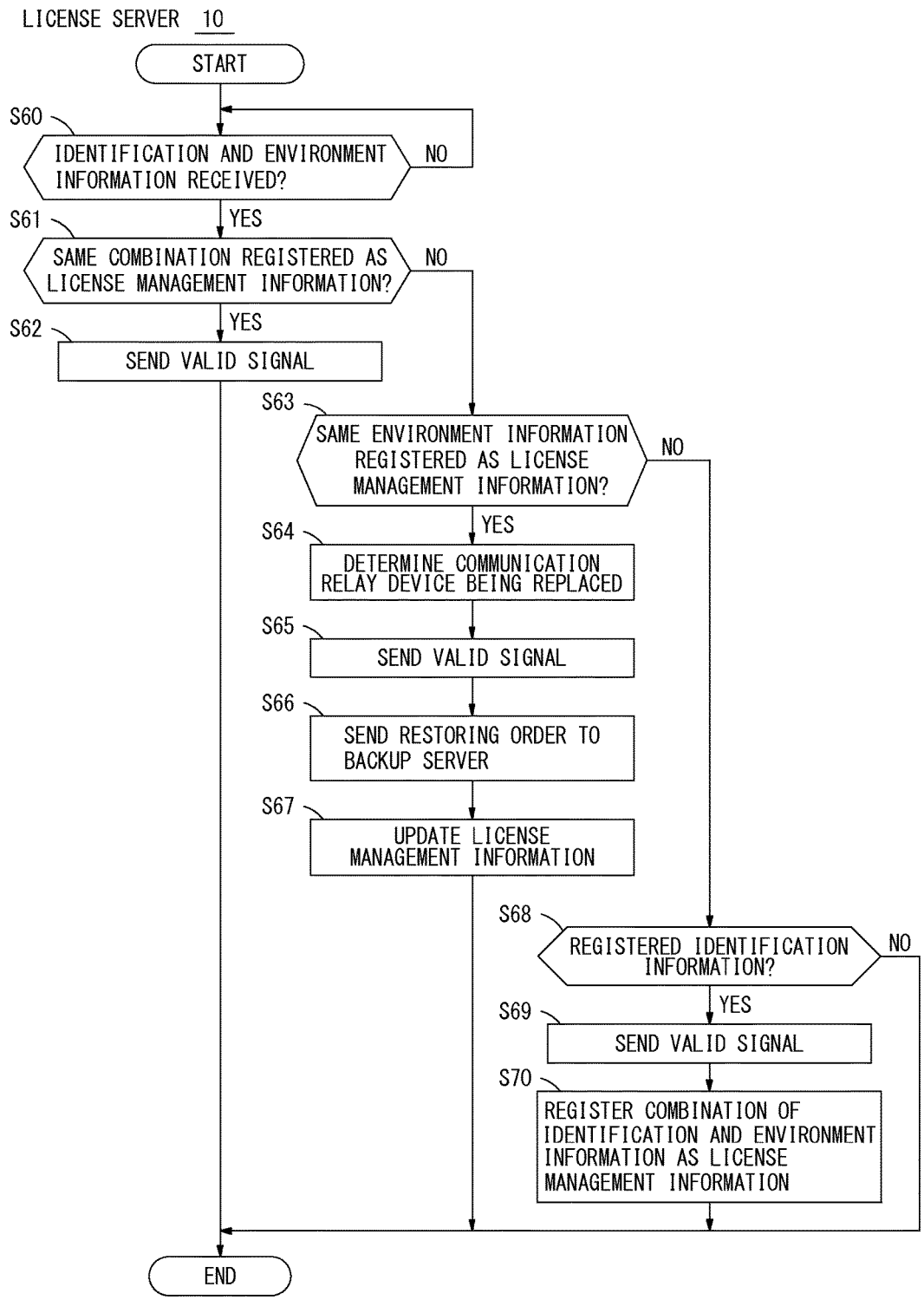

INFORMATION PROCESSING SYSTEM, LICENSE SERVER, COMMUNICATION RELAY DEVICE, NON-TRANSITORY READABLE RECORDING MEDIUM AND DATA RESTORATION METHOD

This application is based on the application No. 2014-183990 filed in Japan, the contents of which are hereby incorporated by reference.

BACKGROUND OF THE INVENTION

Field of the Invention

The present invention relates to an information processing system, a license server, a communication relay device, a non-transitory readable recording medium and a data restoration method. The present invention more specifically relates to a technique of data restoration when the communication relay device that relays communications between an application server and an image processing device is replaced.

Description of the Background Art

Even when a conventional encryption key in device becomes unusable, encrypted data stored in a storage in the device is recovered. This known technique is introduced for example in Japanese Patent Application Laid-Open No. JP 2008-236092 A. According to this known technique, the encryption key is printed in advance on a sheet before a controller board is broken. If the controller board is replaced due to the malfunction, a user inputs the encryption key printed in advance on the sheet through an operational panel. Thus, the encryption key is restored in a replaced controller board. The replaced controller board is allowed to decrypt the encrypted data in the storage with the restored encryption key, and restore the data.

Recently, application servers have been installed on a cloud on an internet, and they provide with a variety of application services (cloud services). As the users have an access to the application services at anytime from anywhere, those application services are convenient for the users. Image processing devices such as MFPs (Multifunction Peripherals) installed at places such as offices capable of executing jobs by working in concert with the application servers have been popular along with the popularization of the application services. The image processing device, for example, accesses the application server, thereby downloading data such as a document or an image stored in the application server and executing a print job based on the data, or uploading image data generated by a scan job to the application server.

Also, the application server is allowed to send a job such as a print job to the image processing device. The image processing device, however, is installed on a local network which blocks an access from the internet with a firewall. For the application server to send data such as the print job to the image processing device, a communication relay device that relays communications between the application server and the image processing device is required on the local network. The communication relay device relays the communications between the application server on the cloud and the image processing device on the local network. The communication relay device forwards the data from the application server to the image processing device, or forwards the data from the image processing device to the application server. With installation of the communication relay device on the local network, the application server is allowed to send the data to the image processing device in the local network over the firewall. Thus, the application server and the image processing device are allowed to communicate with each other to work in concert with each other.

The above-described communication relay device generates and stores relay information to relay the communications between the application server and the image processing device. The relay information includes information to communicate with the application server over the internet and information to communicate with the image processing device over the local network, for instance. In response to receiving data which designates the image processing device as an address from the application server, the communication relay device identifies information such as a port number based on the relay information generated in advance, and forwards the data to the image processing device. The communication relay device may receive the data designating the application server as an address from the image processing device. In also this case, the communication relay device identifies the information such as a URL (Uniform Resource Locator) and the port number of the application server based on the relay information, and forwards the data to the application server.

For the system on which the communication relay device relays the communications between the application server and the image processing device as described above, when the communication relay device is broken and does not work anymore, it is replaced to a new communication relay device. In such a case, the relay information is not stored in the new communication relay device. It is required to generate again the relay information. It, however, costs time and effort to newly register the information such as the information to communicate with the application server with the replaced communication relay device. A communication relay function is not recovered immediately. That is why it is expected to transfer the relay information stored in the previous communication relay device to the communication relay device replaced.

In order to use the data restoration method according to the conventional technique, it is required for the user to print in advance the relay information stored in the communication relay device on the sheet as the communication relay device operates normally. If the user has not printed the relay information on the sheet, the data restoration cannot be carried out immediately for the communication relay device newly installed due to the replacement.

SUMMARY OF THE INVENTION

The present invention is intended to solve the above problems. Thus, the present invention is intended to provide an information processing system, a license server, a communication relay device, a non-transitory computer readable recording medium and a data restoration method capable of immediately restoring data such as relay information when the communication relay device is replaced.

First, the present invention is directed to an information processing system comprises an image processing device connected to a network; an application server that provides with an application service for cooperation with the image processing device over the network; a communication relay device that relays communications over the network between the image processing device and the application server; a license server connected to the network, the license server managing the communication relay server; and a backup server that stores therein information received over the network as a backup.

According to one aspect of this invention, the communication relay device includes: a relay information generating part that generates relay information to relay the communications between the image processing device and the application server; a storage part in which the relay information generated by the relay information generating part is stored; a communication relaying part that relays the communications between the image processing device and the application server based on the relay information in the storage part; a backup part that sends the relay information in the storage part to the backup server at a predetermined timing; an identification information transmission part that reads identification information stored in a predetermined storage medium and sends the read identification information to the license server; and a setting applying part that obtains the relay information from the backup server and stores the obtained relay information in the storage part in response to receiving a valid signal from the license server as the relay information is not stored in the storage part after the identification information transmission part sends the identification information. The license server includes: a license managing part that manages license management information, the identification information of the communication relay device being registered as the license management information; a determining part that determines whether or not the communication relay device is replaced based on the license management information when the identification information is received from the communication relay device; and a relay information restoring part that sends the valid signal to the communication relay device and causes the backup server to send the relay information stored in the backup server to the communication relay device when the determining part determines that the communication relay device is replaced.

Second, the present invention is directed to a license server that manages a communication relay device on an information processing system comprising an image processing device connected to a network; an application server providing over the network with an application service for cooperation with the image processing device; a communication relay device relaying communications between the image processing device and the application server over the network; and a backup server in which relay information received from the communication relay device over the network is stored as a backup.

According to one aspect of this invention, the license server comprises: a license managing part that manages license management information, identification information of the communication relay device being registered as the license management information; a determining part that determines whether or not the communication relay device is replaced based on the license management information when the identification information is received from the communication relay device; and a relay information restoring part that restores the relay information stored in the backup server into the communication relay device when the determining part determines that the communication relay device is replaced.

Third, the present invention is directed to a communication relay device relaying communications over a network between an image processing device and an application server.

According to one aspect of this invention, the communication relay device comprises: a relay information generating part that generates relay information to relay the communications between the image processing device and the application server; a storage part in which the relay information generated by the relay information generating part is stored; a communication relaying part that relays the communications between the image processing device and the application server based on the relay information in the storage part; a backup part that sends the relay information in the storage part to a backup server connected to the network at a predetermined timing; an identification information transmission part that reads identification information stored in a predetermined storage medium and sends the read identification information to a license server connected to the network; and a setting applying part that obtains the relay information from the backup server and stores the obtained relay information in the storage part in response to receiving a valid signal from the license server as the relay information is not stored in the storage part after the identification information transmission part sends the identification information.

Fourth, the present invention is directed to a non-transitory computer readable recording medium storing a program to be executed by a license server that manages a communication relay device on an information processing system comprising an image processing device connected to a network; an application server providing over the network with an application service for cooperation with the image processing device; a communication relay device relaying communications between the image processing device and the application server over the network; and a backup server in which relay information received from the communication relay device over the network is stored as a backup.

According to one aspect of this invention, execution of the program by the license server causing the license server to execute the steps of: (a) managing license management information, identification information of the communication relay device being registered as the license management information; (b) determining whether or not the communication relay device is replaced based on the license management information when the identification information is received from the communication relay device; and (c) restoring the relay information stored in the backup server into the communication relay device when the communication relay device is determined to be replaced in the step (b).

Fifth, the present invention is directed to a non-transitory computer readable recording medium storing an application program to be executed by a communication relay device relaying communications over a network between an image processing device and an application server.

According to one aspect of this invention, execution of the program by the communication relay device causing the communication relay device to execute the steps of: (a) generating relay information to relay the communications between the image processing device and the application server, and storing the generated relay information in a predetermined storage part; (b) relaying the communications between the image processing device and the application server based on the relay information in the storage part; (c) sending the relay information in the storage part to a backup server connected to the network at a predetermined timing; (d) reading identification information stored in a predetermined storage medium and sending the read identification information to a license server connected to the network; and (e) obtaining the relay information from the backup server and storing the obtained relay information in the storage part in response to receiving a valid signal from the license server as the relay information is not stored in the storage part after the identification information is sent in the step (d).

Sixth, the present invention is directed to a data restoration method for a replacement of a communication relay device on an information processing system comprising: an image processing device connected to a network; an application server providing with an application service that requires cooperation with the image processing device over the network; a communication relay device relaying communications over the network between the image processing device and the application server; a license server connected to the network, managing the communication relay server; and a backup part storing therein information received over the network as a backup.

According to one aspect of this invention, the data restoration method comprises the steps of: generating license management information at the license server, identification information of the communication relay device being registered as the license management information; generating relay information to relay the communications between the image processing device and the application server and storing the generated relay information in a predetermined storage part at the communication relay device; relaying the communications between the image processing device and the application server based on the relay information in the storage part at the communication relay device; sending the relay information in the storage part to the backup server at a predetermined timing from the communication relay device; reading the identification information stored in a predetermined storage medium at the communication relay device and sending the read identification information to the license server after a replacement of the communication relay device; determining whether or not the communication relay device is replaced based on the license management information at the license server when the identification information is received from the communication relay device; sending a valid signal to the communication relay device and causing the backup server to send the relay information stored in the backup server to the communication relay device when the license server determines that the communication relay device is replaced; and obtaining the relay information from the backup server and storing the obtained relay information in the storage part in response to receiving the valid signal from the license server as the relay information is not stored in the storage part after the communication relay device sends the identification information.

BRIEF DESCRIPTION OF THE DRAWINGS

FIG. 5 shows an example of management information;

FIG. 6 shows an example of relay information;

FIG. 8 shows an example of license management information;

FIG. 17 shows an example of the license management information of the third preferred embodiment;

FIG. 18 is a flow diagram explaining an exemplary sequential procedure of the process performed at the communication relay device of the third preferred embodiment; and FIG. 19 is a flow diagram explaining an exemplary sequential procedure of the process performed at the license server of the third preferred embodiment.

DESCRIPTION OF THE PRESENT PREFERRED EMBODIMENTS

Figure 1:
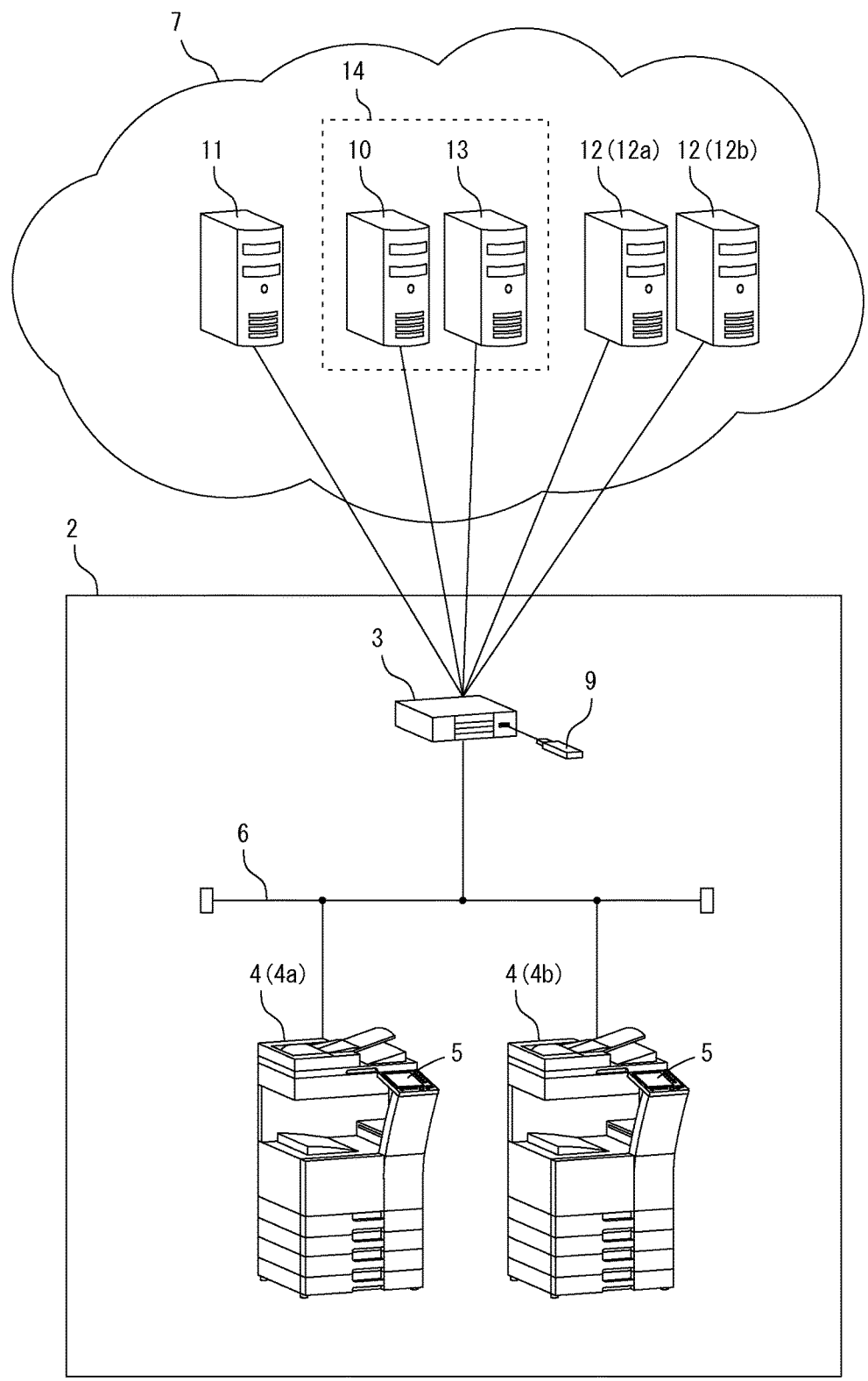
FIG. 1 shows an exemplary configuration of an information processing system of a first preferred embodiment.

Preferred embodiments of the present invention are described in detail below with reference to figures. In the description given below, those elements which are shared in common among figures are represented by the same reference numerals, and these elements are not discussed repeatedly for the same description.

First Preferred Embodiment

FIG. 1 shows an exemplary configuration of an information processing system 1 of the first preferred embodiment of the present invention. The information processing system 1 comprises a communication relay device 3, an image processing device 4, a license server 10, a backup server 11, an application server 12 and a platform server 13. The communication relay device 3 and the image processing device 4 are installed in a local environment 2 such as an office, and connected to a local network 6 such as a LAN (Local Area Network). The license server 10, the backup server 11, the application server 12 and the platform server 13 are installed on a cloud 7 on an internet. In the example of FIG. 1, two image processing devices 4a and 4b are connected to the local network 6. The number of the image processing devices 4, however, is not necessarily two. Also, in the example of FIG. 1, two application servers 12a and 12b are installed on the cloud 7. The number of the application servers 12, however, is not necessarily two. Moreover, multiple communication relay devices 3 may be installed in the local environment 2. A firewall is installed at connecting part to the internet of the local network 6, which is not shown in FIG. 1.

The application server 12 provides with a various types of application services (cloud services) over the internet. The services provided by the application server 12 include storage services for storing uploaded data and information processing services for executing variety of information processing such as edition, processing and conversion of the uploaded data, for example. The two application servers 12a and 12b as shown in FIG. 1 provide with the different application service from each other, for example.

The image processing device 4, for example, constructed by one of MFPs, is capable of executing jobs such as copy jobs, print jobs and scan jobs. The image processing device 4 is provided with an operational panel 5, a user interface for the user to operate the image processing device 4. By operating the operational panel 5, the user is allowed to specify the type of the job and give the instruction to the image processing device 4 on execution of the job. By communicating with the application server 12 on the cloud 7, the image processing device 4 is capable of working in concert with the application server 12 to execute the job.

The communication relay device 3 relays the communications between the image processing device 4 connected to the local network 6 and the application server 12 installed on the cloud 7. The communication relay device 3 communicates with the license server 10 when it is being powered on and started up, for example. The communication relay device 3 then authenticated by the license server 10. In response to receiving a valid signal which shows that the license is valid from the license server 10, the communication relay device 3 activates a communication relay function to start relaying the communications between the image processing device 4 and the application server 12.

The license server 10 authenticates the license of the communication relay device 3 installed in the local environment 2. The license server 10 determines if the license of the communication relay device 3 is valid based on information received from the communication relay device 3, then sends the determination result to the communication relay device 3. When the license is valid, for example, the license server 10 sends the valid signal to the communication relay device 3.

The backup server 11 stores therein various types of information received over the internet as a backup. The backup server 11 stores and holds the information from the communication relay device 3 in the local environment 2.

When the application server 12 starts communicating with the image processing device 4 in the local environment 2, the platform server 13 causes the communication relay device 3 to establish connection with the application server 12. The platform server 13 of the first preferred embodiment is constructed as a server different from the license server 10 as an example. However, this is given not for limitation. The license server 10 and the platform server 13 may be constructed by a server 14.

A storage medium 9 such as a USB memory in which identification information 31, which is described in detail later, is stored can be attached to the communication relay device 3 of the first preferred embodiment as shown in FIG. 1. The communication relay device 3 reads the identification information 31 stored in the storage medium 9 and sends the read identification information 31 to the license server 10 so that the license server 10 authenticates the communication relay device 3. In response to receiving the valid signal from the license server 10, the communication relay device 3 starts the operations to relay the communications between the image processing device 4 and the application server 12. The communication relay device 3 may be replaced because of the trouble, for instance. In such a case, the storage medium 9 is removed from the communication relay device 3 before the replacement, and attached to the communication relay device 3 newly installed due to the replacement.

The communication relay device 3 searches for the image processing device 4 connected to the local network 6 at the startup, for instance, and identifies a relay target device that the communication relay device 3 relays the communications between which and the application server 12. The multiple communication relay devices 3 may be installed on the local network 6, for example. In this case, the communication relay device 3 communicates with the other communication relay devices 3 at the search for the image processing device 4. The communication relay device 3 excludes the image processing device 4 already managed by another communication relay device 3 as the relay target device, and only extracts the image processing device 4 that should relay to identify the extracted image processing device 4 as the relay target device. After activating the communication relay function, the communication relay device 3 relays the communications between the image processing device 4 identified in advance as the relay target device and the application server 12.

At first relay of the communications between the image processing device 4 and the application server 12, the communication relay device 3 generates relay information to relay the communications between the application server and the image processing device. The relay information includes, for instance, information to communicate with the application server 12 over the internet, and information to communicate with the image processing device 4 over the local network 6. The communication relay device 3 is configured to store the relay information, and forward data based on the relay information generated in advance at relay of the communications between the image processing device 4 and the application server 12 from next time.

The communication relay device 3 sends the relay information to the backup server 11 at a predetermined timing. In response to receiving the relay information from the communication relay device 3, the backup server 11 is configured to store the received relay information.

Figure 2:
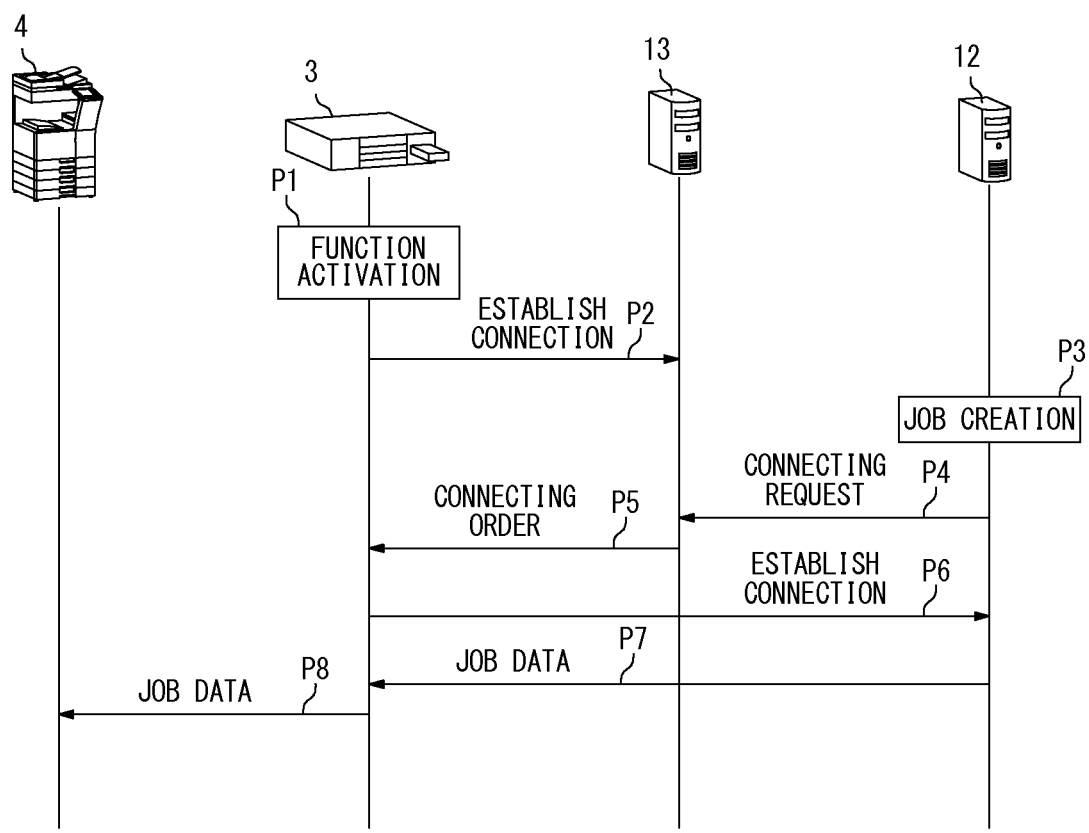
FIG. 2 shows an example of a first communication process performed when a communication relay device relays communications between an image processing device and an application server.

FIG. 2 shows an example of a first communication process performed when the communication relay device 3 relays the communications between the image processing device 4 and the application server 12. In the first communication process, it is explained as an example when job data is sent to the image processing device 4 from the application server 12. It is assumed, for example, the user boots a browser on an information processing terminal such as a personal computer or a tablet terminal, and accesses the application server 12. In this case, the user operates the screen of the application server 12 displayed by the browser, thereby giving the instruction to send the job data to the application server 12 by designating the image processing device 4 installed in the local environment 2. The job data is data such as document data or image data stored in the application server 12, for instance. After receiving the user instruction to send the job data, the application server 12 starts a process to send the job data to the image processing device 4 in the local environment 2 based on the instruction.

The application server 12, however, is installed in a network environment which is different from the local network 6, and it is not allowed to have information such as an IP address of the image processing device 4 to which the job data is sent. Moreover, the firewall is installed in the local environment 2. Hence, the application server 12 is not allowed to send the job data directly to the image processing device 4. The transmission of the job data based on the first communication process as shown in FIG. 2, therefore, is carried out.

After activating the communication relay function as shown in FIG. 2 (process P1), the communication relay device 3 establishes the connection with the platform server 13 (process P2). As a result, the communication relay device 3 and the platform server 13 are connected to each other on a regular basis, and the data transmission from the platform server 13 to the communication relay device 3 becomes always available. When any job to be sent to the image processing device 4 is created at the application server 12 (process P3), the application server 12 sends a connecting request to the platform server 13 (process P4). The connecting request includes information to identify the image processing device 4 to which the job data is sent. The image processing device 4 installed in the local environment 2 and the communication relay device 3 relays the communications of the image processing device 4 are associated in advance with each other and they are registered with the platform server 13. After receiving the connecting request from the application server 12, the platform server 13 identifies the image processing device 4 to which the job data is sent based on the connecting request, and specifies the communication relay device 3 which relays the communications of the identified image processing device 4. The platform server 13 sends a connecting order to the specified communication relay device 3 (process P5). The connecting order includes information to identify the application server 12.

In response to receiving the connecting order from the platform server 13, the communication relay device 3 identifies the application server 12 to connect, and establishes the connection with the identified application server 12 (process P6). As a result, the application server 12 is allowed to send the data to the communication relay device 3 in the local environment 2 over the firewall. With the establishment of the connection with the communication relay device 3, the application server 12 sends the job data to the communication relay device 3 (process P7). After receiving the job data from the application server 12, the communication relay device 3 identifies information such as a port number based on the relay information generated in advance, and forwards the job data to the image processing device 4 identified by the application server 12 with the port number (process P8). In response to receiving the job data from the communication relay device 3, the image processing device 4 executes the job such as the print job based on the received job data. Through the above-described first communication process, the job data is sent normally from the application server 12 to the image processing device 4.

Figure 3:
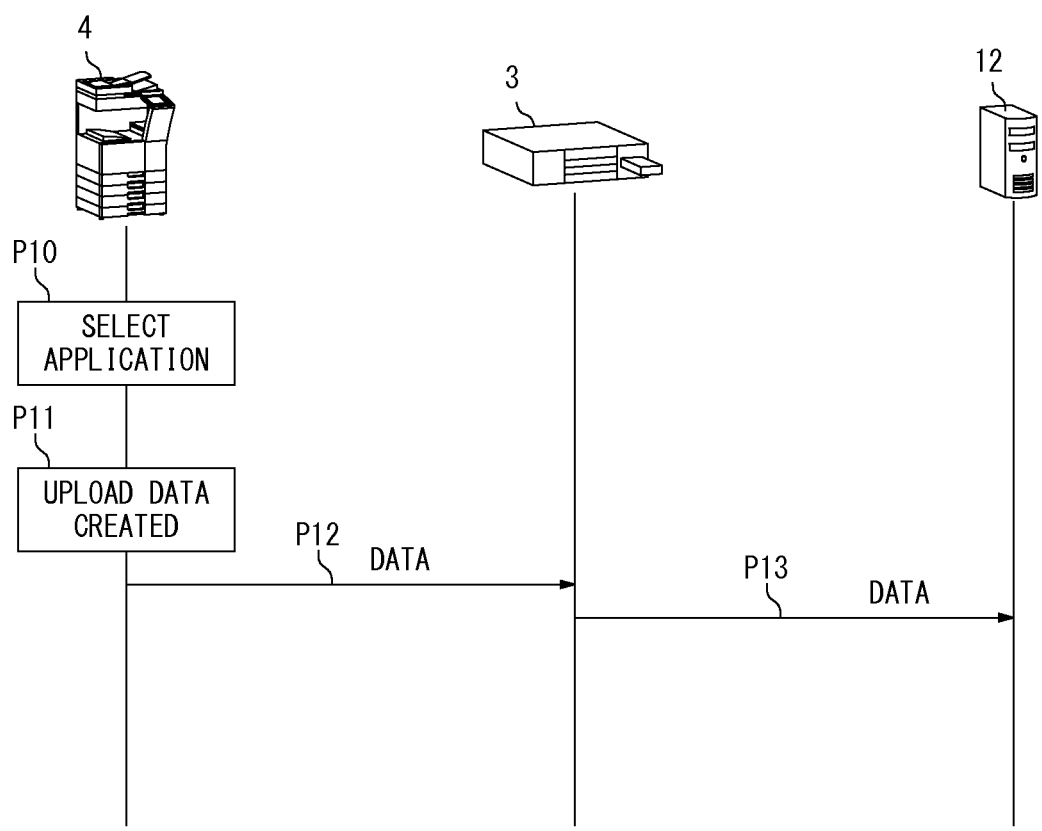
FIG. 3 shows an example of a second communication process performed when the communication relay device relays the communications between the image processing device and the application server.

FIG. 3 shows an example of a second communication process performed when the communication relay device 3 relays the communications between the image processing device 4 and the application server 12. In the second communication process, it is explained as an example when upload data is sent to the application server 12 from the image processing device 4. The application server 12 is registered in advance with the image processing device 4, for example, so that an application provided by the application server 12 is displayed in a manner which is allowed to be selected on the operational panel 5. It is assumed that the user operates the operational panel 5 to select the application provided by the application server 12 (process P10). In this case, the image processing device 4 executes the job for cooperation with the application server 12, and generates data to upload to the application server 12 (process P11). This upload data may be generated by reading the document with the scan job, for example, or by reading data stored in a predetermined storage region such as a BOX. After generating the upload data, the image processing device 4 sends the generated upload data to the communication relay device 3 (process P12). In response to receiving the upload data from the image processing device 4, the communication relay device 3 identifies information such as the URL or the port number of the application server 12 based on the relay information generated in advance, and sends the upload data to the application server 12 identified by the image processing device 4 (process P13). The application server 12 performs a process such as that to store the upload data received from the communication relay device 3, then provides with the application service. Through the second communication process, the data is normally sent to the application server 12 from the image processing device 4.

The license server 10 on the information processing system 1 configured as described above determines whether or not the communication relay device 3 is replaced to a new one at authenticating the communication relay device 3 installed in the local environment 2. The license server 10 may determine that the communication relay device 3 is replaced. In this case, the license server 10 sends the valid signal to the replaced new communication relay device 3 to activate the communication relay function. Also, the license server 10 performs a process to restore the relay information generated by the last communication relay device 3 in the backup server 11 into the replaced new communication relay device 3. Thus, the replaced new communication relay device 3 is not required to generate the relay information again from scratch, resulting in an efficient activation of the communication relay function. The communication relay device 3 and the license server 10 perform the aforementioned process are described in detail next.

Figure 4:
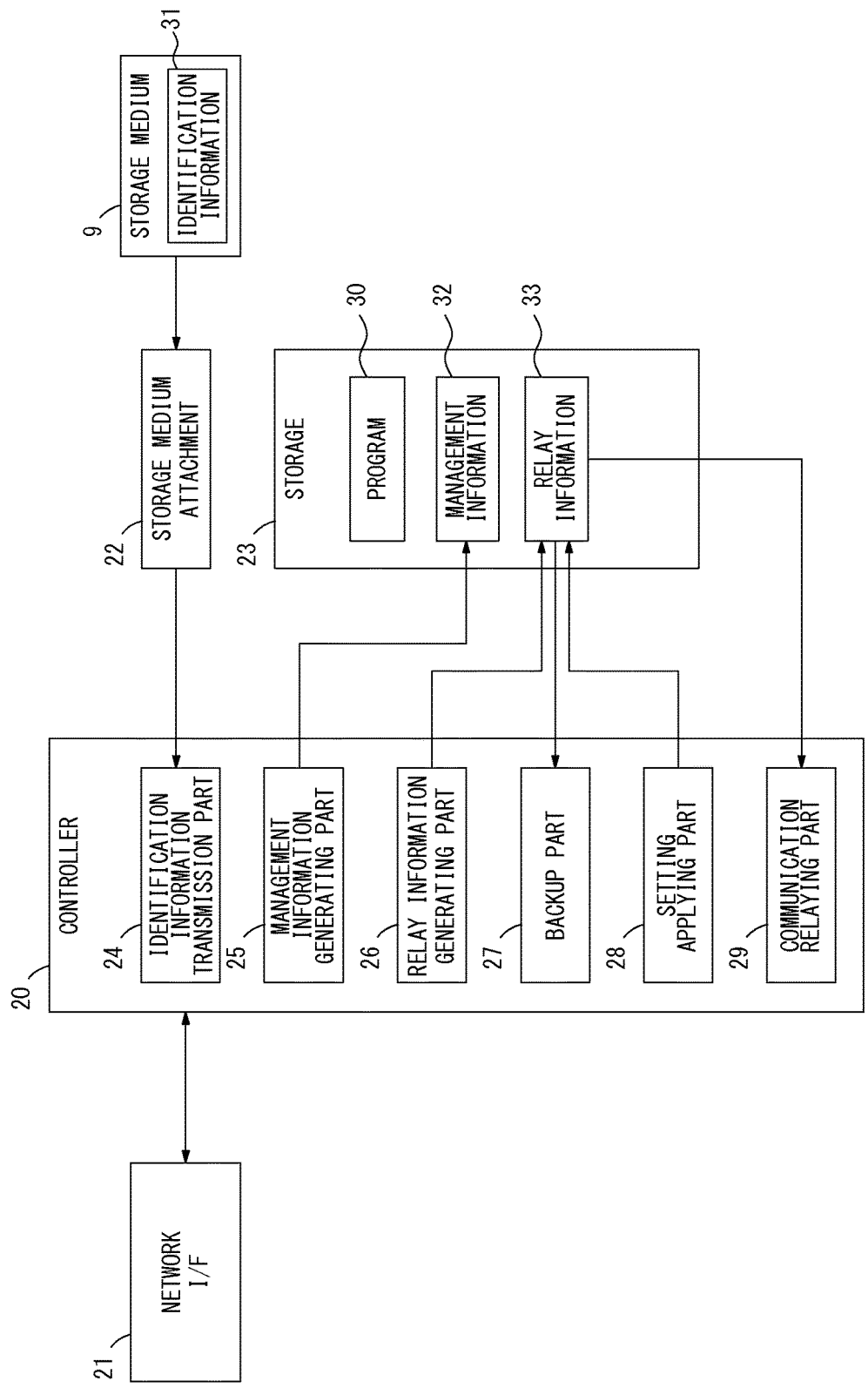
FIG. 4 is a block diagram showing an example of a hardware structure and that of a functional structure of the communication relay device.

FIG. 4 is a block diagram showing an example of a hardware structure and that of a functional structure of the communication relay device 3. The communication relay device 3 includes a controller 20, a network interface 21, a storage medium attachment 22 and a storage 23. The controller 20 which includes a CPU and a memory controls operations of each part. The network interface 21 is to connect the communication relay device 3 to the local network 6. The communication relay device 3 communicates with the image processing device 4 or the aforementioned various types of servers via the network interface 21. The storage medium attachment 22 is an interface to attach the storage medium 9 in which the identification information 31 is stored. The storage 23 constructed by a device such as a semiconductor memory or a magnetic storage, for instance, stores therein a program 30, management information 32 and relay information 33.

The CPU in the controller 20 reads and executes the program 30 stored in the storage 23 when the communication relay device 3 is powered on. As a result, the controller 20 serves as an identification information transmission part 24, a management information generating part 25, a relay information generating part 26, a backup part 27, a setting applying part 28 and a communication relaying part 29.

The identification information transmission part 24 is brought into operation when execution of the program 30 is started. The identification information transmission part 24 reads the identification information 31 in the storage medium 9 attached to the storage medium attachment 22, then sends the read identification information 31 to the license server 10 via the network interface 21. To be more specific, the identification information transmission part 24 is authenticated by the license server 10. After sending the identification information 31, the identification information transmission part 24 receives the valid signal from the license server 10. The identification information transmission part 24 then effectively brings the communication relaying part 29 into operation. If the valid signal is not received from the license server 10, the identification information transmission part 24 does not bring the communication relaying part 29 into operation.

The management information generating part 25 is brought into operation when execution of the program 30 is started. The management information generating part 25 searches for the image processing device 4 connected to the local network 6, and identifies the image processing device 4 to be the relay target device. The management information generating part 25 then registers the identified image processing device 4 with the management information 32. FIG. 5 shows an example of the management information 32. As shown in FIG. 5, information such as an IP address or a MAC (Media Access Control) address of the image processing device 4, which is the relay target device, is registered as the management information 32. If there is another communication relay device 3 on the local network 6, the management information generating part 25 obtains the management information 32 from another communication relay device 3. The management information generating part 25 identifies the image processing device 4 which is not the target of relay of another image processing device 4 as the relay target device, then registers with its management information 32. The management information generating part 25 searches for the image processing device 4 on a periodical basis, and updates the management information 32 as required. After registering the new information with the management information 32, the management information generating part 25 sends the management information 32 to the platform server 13. As a result, the platform server 13 is allowed to designate the communication relay device 3 that relays the communications of the image processing device 4 installed in the local environment 2.

The relay information generating part 26 generates the relay information 33 to relay the communications between the image processing device 4 and the application server 12, and stores the generated relay information 33 in the storage 23. FIG. 6 shows an example of the relay information 33. The relay information 33 includes server connecting information and LAN connecting information. The server connecting information includes the URL of the application server 12 and the port number for communication with the application server 12, for instance. The LAN connecting information includes the port number for the communication with the image processing device 4, for instance. At the first communication with the application server 12 which has not been registered yet as the relay information 33, for example, the relay information generating part 26 generates a pair of the server connecting information and the LAN connecting information and registers as the relay information 33. By giving an example, for registering the application server 12 with the image processing device 4, the registration information relating to the application is sent from the application server 12 to the image processing device 4 via the communication relay device 3. The relay information generating part 26 then generates the pair of the server connecting information and the LAN connecting information and registers as the relay information 33 by associating the pair of the server connecting information and the LAN connecting information with each other.

The backup part 27 sends the relay information 33 stored in the storage 23 at a predetermined timing to the backup server 11 and performs the backup process. The backup part 27 may send the relay information 33 to the backup server 11 after a predetermined period of time from the previous transmission, or when the relay information 33 in the storage 23 is updated. The backup part 27 sends the relay information 33 to the backup server 11 so that the information the same as the relay information 33 stored in the storage 23 is stored in the backup server 11.

The setting applying part 28 obtains the relay information 33 in the backup server 11 and restores the obtained relay information 33 in the storage 23, thereby applying the settings at the last communication relay device 3. It is assumed, for example, that the communication relay device 3 in the local environment 2 is replaced to a new one because of the trouble of the communication relay device 3. In this case, the new communication relay device 3 is authenticated by the license server 10 at its startup. By receiving the valid signal from the license server 10, the new communication relay device 3 effectively brings the communication relaying part 29 into operation. The relay information 33, however, has not been stored in the storage 23 of the new communication relay device 3 when the communication relaying part 29 is brought into operation. The setting applying part 28 becomes operative when the valid signal is received from the license server 10 without the relay information 33 stored in the storage 23. After receiving the valid signal, the setting applying part 28 accesses the backup server 11 based on the connecting order received from the license server 10 or the platform server 13. The setting applying part 28 then obtains the relay information 33 stored by the last communication relay device 3 before the trouble from the backup server 11 and stores the obtained relay information 33 in the storage 23.

When the communication relay device 3 is newly installed in the local environment 2, the relay information 33 to be restored is not stored in the backup server 11. In such a case, the communication relay device 3 does not receive the connecting order to the backup server 11 after receiving the valid signal from the license server 10. The setting applying part 28 may not receive the connecting order to the backup server 11 for the predetermined period of time after receiving the valid signal. In this case, the setting applying part 28 terminates the function without restoring the relay information 33. The relay information 33 newly generated by the relay information generating part 26 is then stored in the storage 23.

The communication relaying part 29 relays the communications between the image processing device 4 and the application server 12. The communication relaying part 29 relays the communications between the image processing device 4 and the application server 12 based on the relay information 33 in the storage 23. It is assumed, for example, the communication relaying part 29 receives the data to send to the image processing device 4 from the application server 12. In this case, the communication relaying part 29 forwards the data to the image processing device 4 based on the relay information 33 with the port number of the LAN connecting information associated with the application server 12 which has sent the data. The communication relaying part 29 refers the management information 32 to convert the address, for instance, and forwards the data to the image processing device 4 identified by the application server 12.

The communication relaying part 29 forwards the data received from the certain application server 12 to the image processing device 4 with the particular port number, thereby receiving the data sent to the certain application server 12 from the image processing device 4 with the particular port number. In response to receiving the data from the image processing device 4, the communication relaying part 29 refers the relay information 33 based on the port number with which the data is received, thereby designating the application server 12 to which the data is forwarded and sending the data to the designated application server 12.

At the first communication with the new application server 12 which is not registered with the relay information 33, the communication relaying part 29 provides with the new port number to communicate with the image processing device 4 and notifies the relay information generating part 26 of the port number. The information relating to the new application server 12 is then registered with the relay information 33.

The communication protocol for the communications with the application server 12 and the communication protocol for the communications with the image processing device 4 may be different from each other. In such a case, information such as protocol conversion information to convert the protocols may be registered with the relay information 33 besides the information shown in FIG. 6. In this case, the communication relaying part 29 converts the protocols based on the protocol conversion information registered in advance with the relay information 33 and forwards the data.

Figure 7:
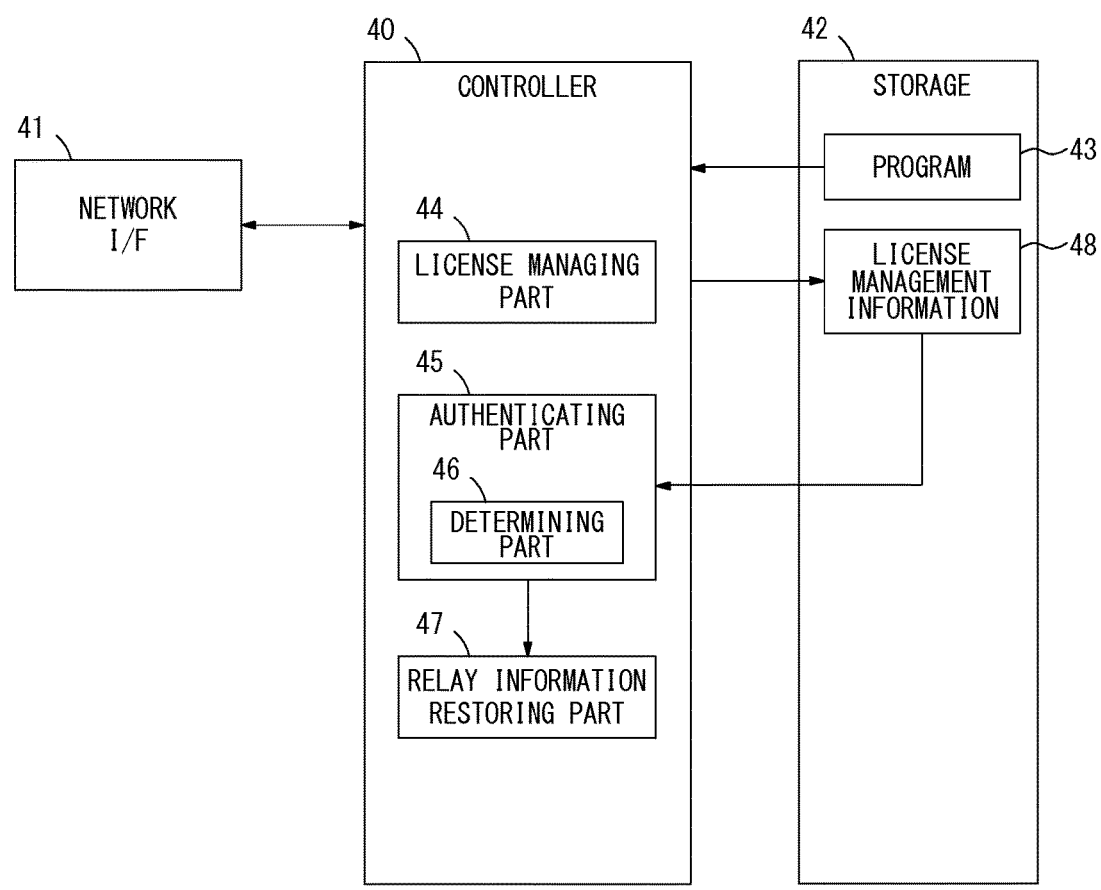
FIG. 7 is a block diagram showing an example of a hardware structure and that of a functional structure of a license server.

FIG. 7 is a block diagram showing an example of a hardware structure and that of a functional structure of the license server 10. The license server 10 includes a controller 40, a network interface 41 and a storage 42. The controller 40 which includes a CPU and a memory controls operations of each part. The network interface 41 is to connect the license server 10 to the internet. The license server 10 communicates with the communication relay server 3 and the backup server 10 via the network interface 41. The storage 42 constructed by a device such as a semiconductor memory or a magnetic storage, for instance, stores therein a program 43 and license management information 48.

The CPU in the controller 40 reads and executes the program 43 stored in the storage 42 when the license server 10 is powered on. As a result, the controller 40 serves as a license managing part 44, an authenticating part 45 and a relay information restoring part 47.

The license managing part 44 generates the license management information 48 to manage the license of the communication relay device 3 installed in the local environment 2, and stores and manages the generated license management information 48 in the storage 42. FIG. 8 shows an example of the license management information 48. The identification information 31 is registered with the license management information 48, and a valid flag and a replacement flag may be assigned to the identification information 31. The identification information 31 is recorded on the storage medium 9 attached to the communication relay device 3. When the authenticating part 45 determines that the identification information 31 received from the communication relay device 3 is valid, the valid flag is assigned and configured "YES." When the communication relay device 3 in the local environment 2 is replaced, an administrator who manages the license of the communication relay device 3 assigns the replacement flag and configures "YES." More specifically, the information showing that the replacement flag is assigned and configured "YES" is replacement target identification information for identifying whether or not the communication relay device 3 is the target for the replacement.

When the administrator who manages the license of the communication relay device 3 issues the new identification information 31, for example, the license managing part 44 registers the identification information 31 with the license management information 48. This time, neither the valid flag nor the replacement flag is assigned and configured "YES." The administrator who manages the license of the communication relay device 3 assigns the replacement flag of the identification information 33 when the communication relay device 3 in the local environment 2 is replaced. The license managing part 44 then configures the replacement flag of the identification information 31 specified by the administrator "YES."

The authenticating part 45 becomes operative in response to receiving the identification information 31 from the communication relay device 3 to authenticate the communication relay device 3 based on the identification information 31 received from the communication relay device 3. The authenticating part 45 determines the license is valid if the identification information 31 received from the communication relay device 3 is registered with the license management information 48. In this case, the authenticating part 45 sends the valid signal to the communication relay device 3. The valid flag corresponding to the received identification information 31 may not be assigned and configured "YES." The authenticating part 45 then configures the valid flag "YES." More specifically, when the valid flag is configured "YES," it can be said that the authentication by the authenticating part 45 has been carried out at least once. On the other hand, when the identification information 31 received from the communication relay device 3 is not registered with the license management information 48, the authenticating part 45 does not send the valid signal. The communication relaying part 29 of the communication relay device 3 then does not become operative.

The authenticating part 45 includes a determining part 46 which determines whether or not the communication relay device 3 in the local environment 2 is replaced. The determining part 46 becomes operative when the authenticating part 45 determines that the license of the communication relay device 3 is valid. If the replacement flag of the authenticated identification information 31 is configured "YES," the determining part 46 determines that the communication relay device 3 in the local environment 2 is replaced. After determining the communication relay device 3 is replaced, the determining part 46 brings the relay information restoring part 47 into operation.

The relay information restoring part 47 controls the replaced communication relay device 3 to restore the relay information 33 stored in the backup server 11 by the last communication relay device 3 which is the one before replaced. The relay information restoring part 47 sends the restore order to the backup server 11, for instance, thereby causing the backup server 11 to send the relay information 33 stored therein to the replaced communication relay device 3. As the backup server 11 received the restore order is not allowed to send the relay information 33 directly to the communication relay device 3, it requests the platform server 13 to connect to the communication relay device 3.

The platform server 13 sends the connecting order to the backup server 11 to the replaced communication relay device 3 in response to the request. The communication relay device 3 establishes the connection with the backup server 11 based on the received connecting order. The backup server 11 is then allowed to send the relay information 33 to the communication relay device 3. After the connection with the communication relay device 3 is established, the backup server 11 reads the relay information 33 stored as the backup by the last communication relay device 3 and sends the read relay information 33 to the replaced communication relay device 3.

Figure 9:
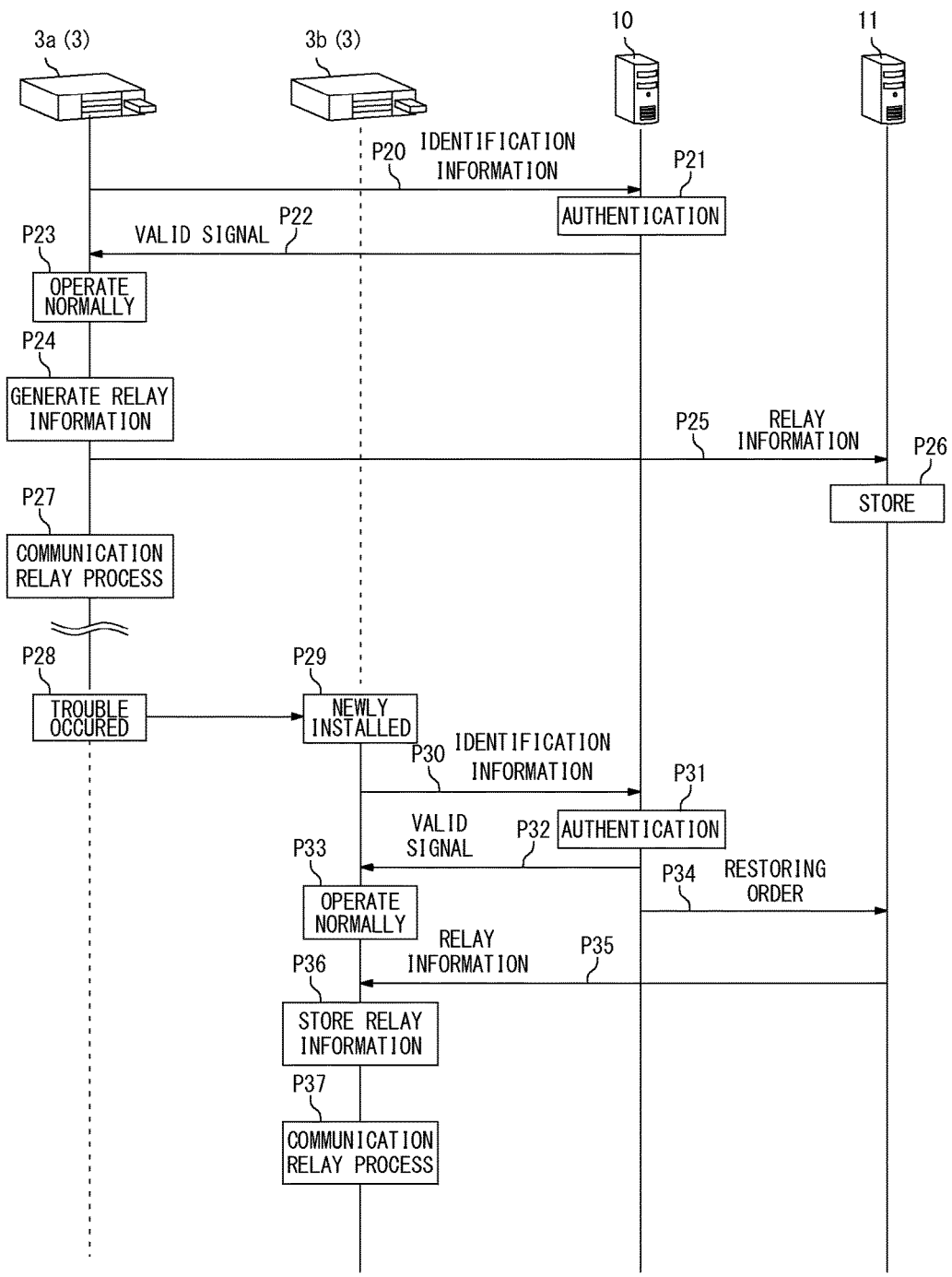
FIG. 9 is a flow diagram explaining an exemplary sequential procedure of a restoration process to restore the relay information in a last communication relay device which is the one before replacement into a replaced communication relay device on the information processing system.

FIG. 9 is a flow diagram explaining an exemplary sequential procedure of a restoration process to restore the relay information 33 in a last communication relay device 3a which is the one before replacement into a replaced communication relay device 3b on the information processing system 1 configured as described above. The communication relay device 3a sends the identification information 31 to the license server 10 at its startup in response to being powered on (process P20). In response to receiving the identification information 31 from the communication relay device 3a, the license server 10 performs the authentication (process P21). If the received identification information 31 is registered with the license management information 48, the license server 10 sends the valid signal to the communication relay device 3a (process P22). The communication relay device 3a puts the communication relaying part 29 into operation normally based on the valid signal (process P23). As communicating with the application server 12, the communication relay device 3a generates the relay information 33 (process P24), and sends the generated relay information 33 to the backup server 11 (process P25). The backup server 11 stores the relay information 33 received from the communication relay device 3a as the backup (process P26). The communication relay device 3a performs the process to relay the communications between the application server 12 and the image processing device 4 (process P27).

Any trouble may occur to the communication relay device 3a (process P28). In this case, the communication relay device 3a is replaced to another communication relay device 3b (process P29). The storage medium 9 attached to the last communication relay device 3a is removed and attached to the replaced communication relay device 3b. The communication relay device 3b newly installed due to the replacement reads the identification information 31 in the storage medium 9 at its startup after being powered on, and sends the read identification information 31 to the license server 10 (process P30). The identification information 31 sent by the communication relay device 3b newly installed is the same as the identification information 31 sent by the last communication relay device 3 before replacement and authenticated by the license server 10. In response to receiving the identification information 31 from the communication relay device 3b, the license server 10 performs the authentication (process P31). If the received identification information 31 is registered with the license management information 48, the license server 10 sends the valid signal to the communication relay device 3b (process P32). The communication relay device 3b then puts the communication relaying part 29 into operation normally (process P33). When determining that the communication relay device 3b is newly installed due to the replacement based on the replacement flag of the license management information 48, the license server 10 sends the restore order to the backup server 11 (process P34). In response to receiving the restore order, the backup server 11 establishes the connection with the communication relay device 3b via the platform server 13 as described above, and sends the relay information 33 stored as the backup by the last communication relay device 3a to the replaced communication relay device 3b (process P35). After receiving the relay information 33, the aforementioned setting applying part 28 of the communication relay device 3b stores the received relay information 33 in the storage 23, and reflects the relay information 33 used by the last communication relay device 3a to the communication relay device 3b without making any change (process P36). The communication relay device 3b then refers the relay information 33 in the storage 23 to relay the communications between the application server 12 and the image processing device (process P37).

The communication relay device 3b replaced and newly installed in the local environment 2 is allowed to automatically obtain the relay information 33 stored in the backup server 11 by the last communication relay device 3a and reflect the obtained relay information 33 to itself at the first startup through the restore process on the information processing system 1 as described above. The replaced communication relay device 3b is not necessary to generate again the relay information 33 from scratch. Also, the replaced communication relay device 3b is allowed to immediately start the process of relaying the communications between the application server 12 and the image processing device 4 with the relay information 33 used by the last communication relay device 3a, resulting in reduction of the period required for restoration due to the replacement.

Figure 10:
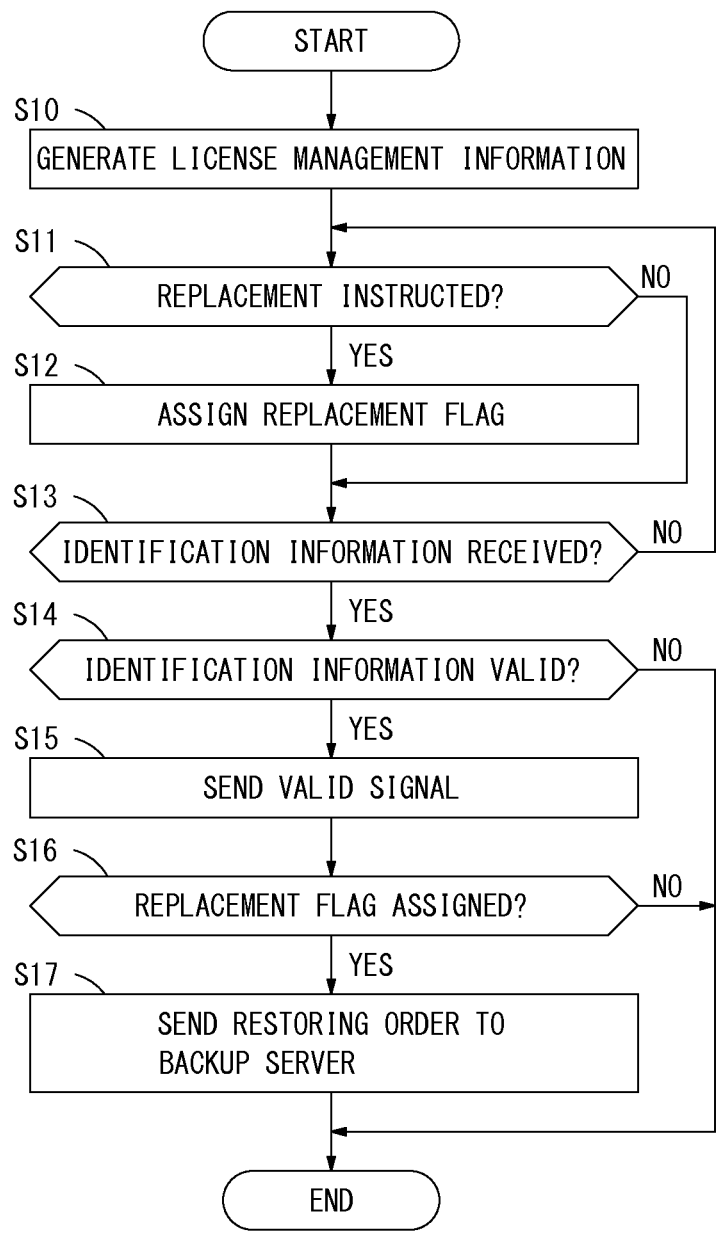
FIG. 10 is a flow diagram explaining an exemplary sequential procedure of the process performed at the license server.

FIG. 10 is a flow diagram explaining an exemplary sequential procedure of the process performed at the license server 10. Upon the start of the process, the license server 10 generates the license management information 48 (step S10). More specifically, the license server 10 obtains the identification information 31 issued by the administrator, and generates the license management information 48 with which the obtained identification information 31 is registered. The license server 10 then determines whether or not the instruction to assign the replacement flag is given by the administrator (step S11). The instruction to assign the replacement flag may be given by the administrator (when a result of step S11 is YES). In this case, the license server 10 assigns the replacement flag of the identification information 31 identified by the administrator and configures "YES" (step S12). The license server 10 determines if the identification information 31 is received from the communication relay device 3 (step S13). If the identification information 31 is not received (when a result of step S13 is NO), the license server 10 returns to the process in step S11.

When the identification information 31 is received (when a result of step S13 is YES), the license server 10 determines whether or not the identification information 31 is the valid information registered with the license management information 48 (step S14). The identification information 31 may be valid (when a result of step S14 is YES). In this case, the license server 10 sends the valid signal to the communication relay device 3 (step S15). The license server 10 then determines if the replacement flag of the identification information 31 which is determined to be valid is assigned and configured "YES" (step S16). When the replacement flag is assigned and "YES" is configured for the replacement flag (when a result of step S16 is YES), the license server 10 sends the restoring order to the backup server 11 (step S17). The restoring order thereby sent includes information which allows to identify the relay information 33 stored by the last communication relay device 3 before the replacement at the backup server 11. Hence, the backup server 11 is allowed to identify the relay information 33 stored by the last communication relay device 3 before the replacement as the backup and send the identified relay information 33 to the replaced communication relay device 3. The received identification information 31 may not be valid (when a result of step S14 is NO). In this case, the license server 10 skips the process in steps S15 to S17. When the replacement flag is not assigned and "YES" is not configured for the replacement flag (when a result of step S16 is NO), the license server 10 skips the process in step S17.

The above-described process is performed at the license server 10 so that the relay information 33 stored by the last communication relay device 3 before the replacement in the backup server 11 may be restored in the replaced communication relay device 3 when the communication relay device 3 in the local environment 2 is replaced.

Figure 11:
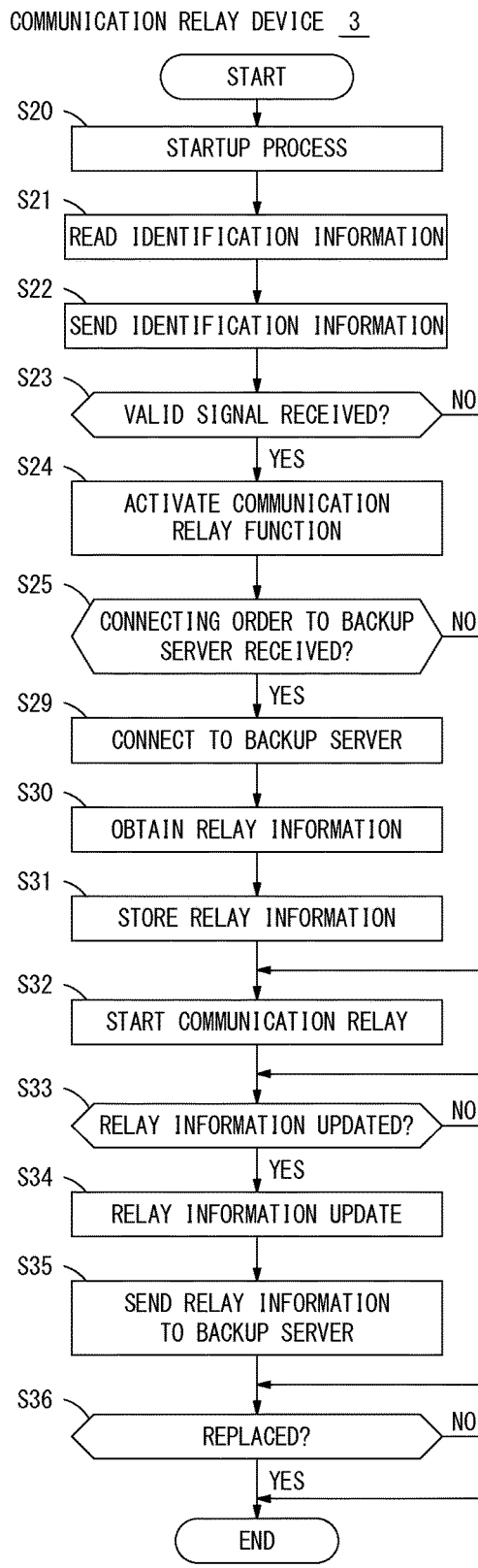
FIG. 11 is a flow diagram explaining an exemplary sequential procedure of the process performed at the communication relay device.

FIG. 11 is a flow diagram explaining an exemplary sequential procedure of the process performed at the communication relay device 3. Together with the startup (step S20) in response to being powered on, the communication relay device 3 reads the identification information 31 in the storage medium 9 (step S21), and sends the read identification information 31 to the license server 10 (step S22). After sending the identification information 31, the communication relay device 3 determines if the valid signal is received from the license server 10 (step S23). In response to receiving the valid signal (when a result of step S23 is YES), the communication relay device 3 activates the communication relay function of the communication relaying part 29 (step S24). The valid signal may not be received (when a result of step S23 is NO). In this case, the communication relay device 3 skips the later process and completes the process.

After activating the communication relay function, the communication relay device 3 determines if the connecting order to the backup server 11 is received (step S25). If no connecting order to the backup server 11 is received (when a result of step S25 is YES), the communication relay device 3 brings the relay information generating part 26 into operation, and performs the relay information generating process (step S26). The communication relay device 3 then stores the relay information 33 in the storage 23 (step S27). The communication relay device 3 sends the relay information 33 stored in the storage 23 to the backup server 11 to store as the backup (step S28).

In response to receiving the connecting order to the backup server 11 (when a result of step S25 is YES), the communication relay device 3 connects to the backup server 11 (step S29). The communication relay device 3 obtains the relay information 33 from the backup server 11 (step S30), and stores the obtained relay information 33 in the storage 23 (step S31). Thus, the communication relay device 3 is allowed to store the relay information 33 in the storage 23 efficiently without putting the relay information generating part 26 into operation.

The communication relay device 3 starts the communication relay process based on the relay information 33 in the storage 23 (step S32). For communicating with the new application server 12, the communication relay device 3 determines that the update of the relay information 33 is required (when a result of step S33 is YES), and performs the relay information update (step S34). In the relay information update, the relay information generating part 26 is put into operation to additionally register the information to communicate with the new application server 12 with the relay information 33. After updating the relay information 33, the communication relay device 3 sends the updated relay information 33 to the backup server 11 (step S35). As a result, the relay information 33 stored in the backup server 11 as the backup is kept up to date.

The communication relay device 3 repeats the process after step S33 until it is replaced to another device due to the trouble (when a result of step S36 is NO). When the communication relay device 3 is replaced to another device due to the trouble (when a result of step S36 is YES), the communication relay device 3 completes the whole process.

As described above, the communication relay device 3 of the first preferred embodiment installed in the local environment 2 sends and stores the relay information 33 in the backup server 11 as the backup as it is brought into operation normally. The relay information 33 stored as the backup is used to relay the communications between the application server 12 and the image processing device 4. The communication relay device 3 in the local environment 2 may be replaced to the new device due to the trouble. In this case, the license server 10 finds out that the communication relay device 3 is replaced when it authenticates the new communication relay device 3. The license server 10 causes the backup server 11 to send the relay information 33 stored in the backup server 11 by the last communication relay device 3 before the replacement to the replaced communication relay device 3. After that the replaced communication relay device 3 is caused to restore the relay information 33 before the replacement in the replaced communication relay device 3. As described above, even when the communication relay device 3 is replaced, the relay information 33 before the replacement may be immediately applied to the replaced communication relay device 3, and the time that the communications between the application server 12 and the image processing device 4 are not available may be the shortest. Also, any manual effort is not necessary for restoring the relay information 33 in the replaced communication relay device 3 so that the replacement process may be done efficiently. To be more specific, the information processing system 1 of the first preferred embodiment allows the whole process from transfer of the license at the replacement of the communication relay device 3 to restoration of the relay information 33 stored in the backup server 11 into the replaced communication relay device 3 automatically. The shortest time is required for making the replaced communication relay device 3 available.

Second Preferred Embodiment

Figure 12:
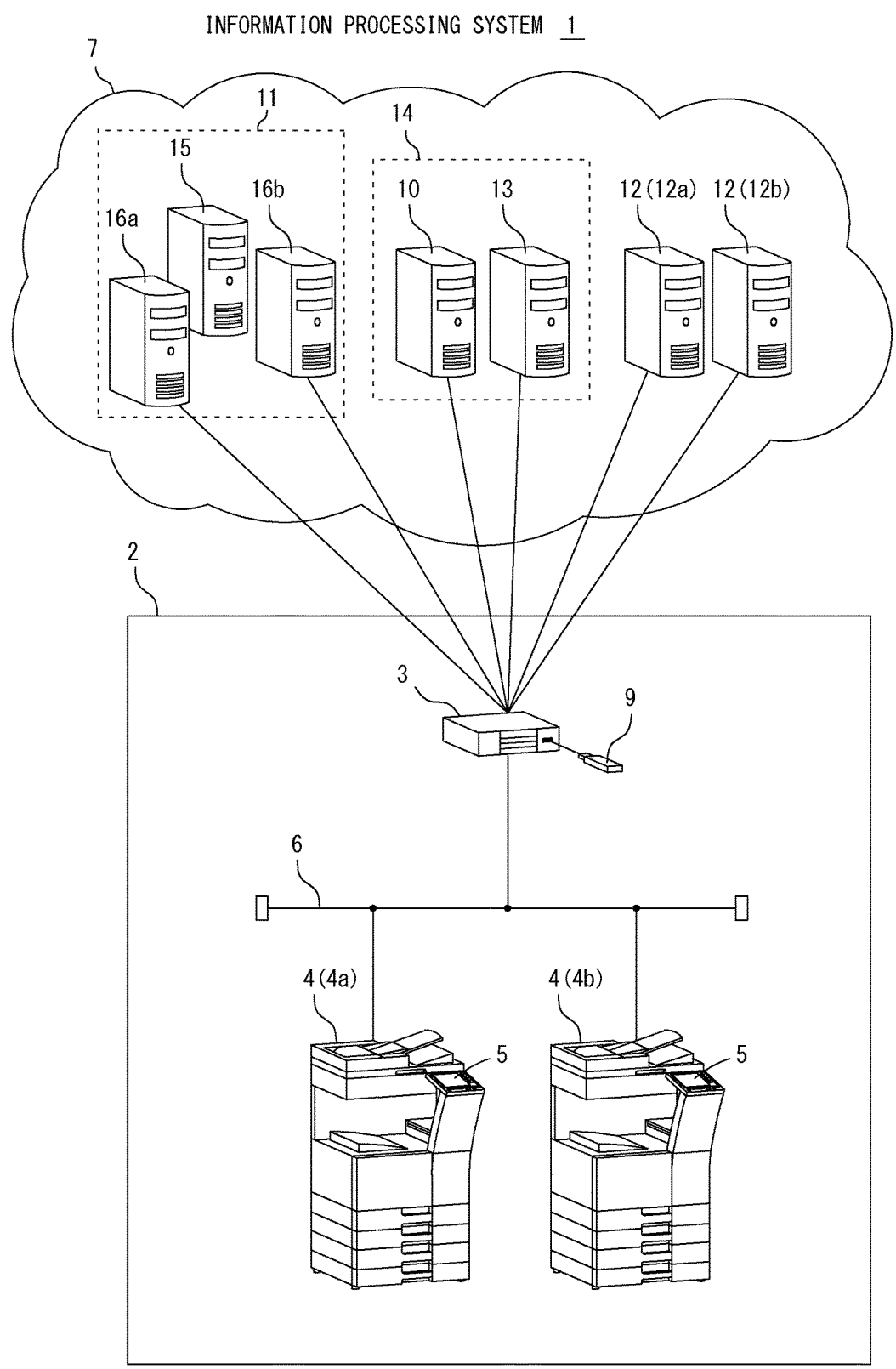
FIG. 12 shows an exemplary configuration of the information processing system of a second preferred embodiment.

The second preferred embodiment is explained next. FIG. 12 shows an exemplary configuration of the information processing system 1 of the second preferred embodiment. What is different from the first preferred embodiment is that the backup server 11 of the information processing system 1 of the second preferred embodiment is formed from multiple servers. To be more specific, the backup server 11 of the second preferred embodiment includes a management server 15 and a number of relay information storage servers 16a and 16b as illustrated in FIG. 12. The relay information storage server 16a for example stores therein the relay information 33 relating to the application server 12a, and the relay information storage server 16b stores therein the relay information 33 relating to the application server 12b. The management server 15 manages the multiple relay information storage servers 16a and 16b. The backup server 11 of the second preferred embodiment is configured to store the relay information 33 received from the communication relay device 3 in the local environment 2 in a number of different relay information storage servers 16a and 16b.

Figure 13:
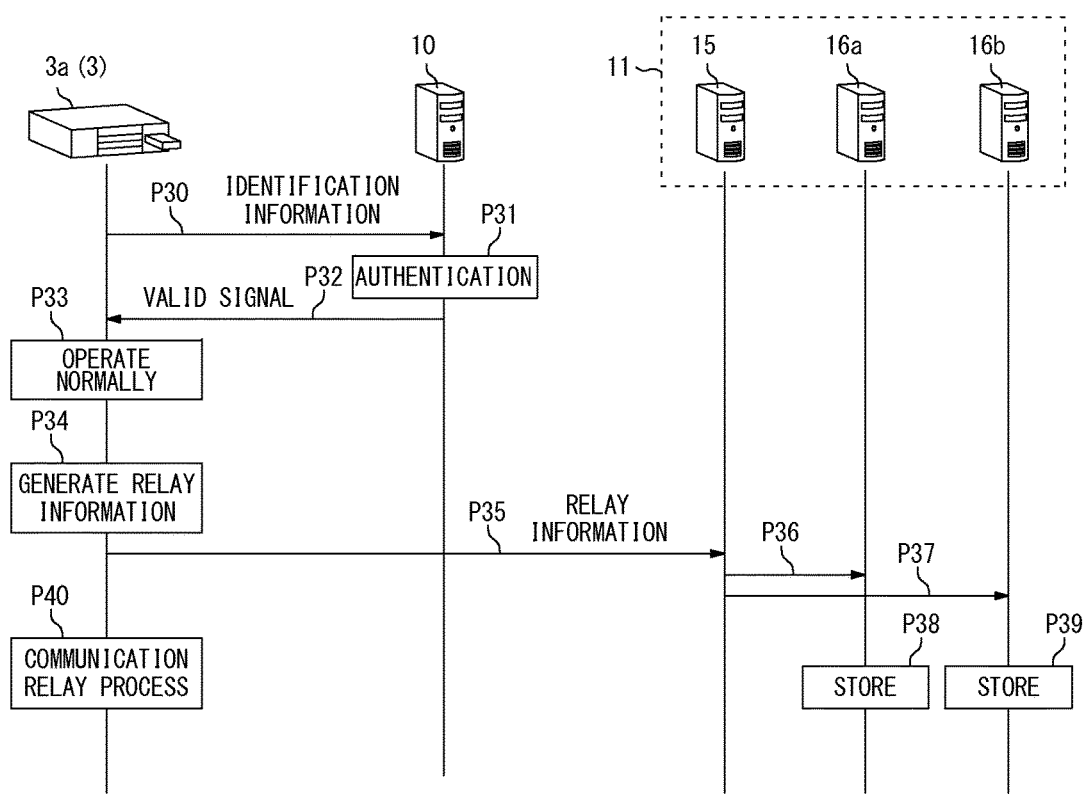
FIG. 13 is a flow diagram explaining an exemplary sequential procedure of a storing process until a backup server of the second preferred embodiment stores the relay information.

FIG. 13 is a flow diagram explaining an exemplary sequential procedure of a storing process until the backup server 11 of the second preferred embodiment stores the relay information 33 as the backup. The communication relay device 3a installed in the local environment 2 at first reads and sends the identification information 31 to the license server 10 at its startup in response to being powered on (process P30). In response to receiving the identification information 31 from the communication relay device 3a, the license server 10 performs the authentication (process P31). If the received identification information 31 is registered with the license management information 48, the license server 10 sends the valid signal to the communication relay device 3a (process P32). The communication relay device 3a puts the communication relaying part 29 into operation normally based on the valid signal (process P33). As communicating with the application server 12, the communication relay device 3a generates the relay information 33 (process P34), and sends the generated relay information 33 to the management server 15 (process P35).

After receiving the relay information 33 from the communication relay device 3a, the management server 15 separates the relay information 33 into the information that corresponds to each of the application servers 12a and 12b. The management server 15 sends the relay information 33 relating to the application 12a to the relay information storage server 16a (step S36), then sends the relay information 33 relating to the application sever 12b to the relay information storage server 16b (step S37). The management server 15 stores the information relating to the relay information storage servers 16a and 16b, the addresses of the relay information 33. The relay information storage server 16a stores the relay information 33 relating to the application server 12a received from the management server 15 as the backup (process P38). Moreover, the relay information storage server 16b stores the relay information 33 relating to the application server 12b received from the management server 15 as the backup (process P39). The communication relay device 3a performs the process to relay the communications between the application server 12 and the image processing device 4 based on the relay information 33 generated in process P34 (process P40). As described above, the relay information 33 received from the communication relay device 3a that is in operation normally is stored in a number of different relay information storage servers 16a and 16b of the second preferred embodiment.

Figure 14:
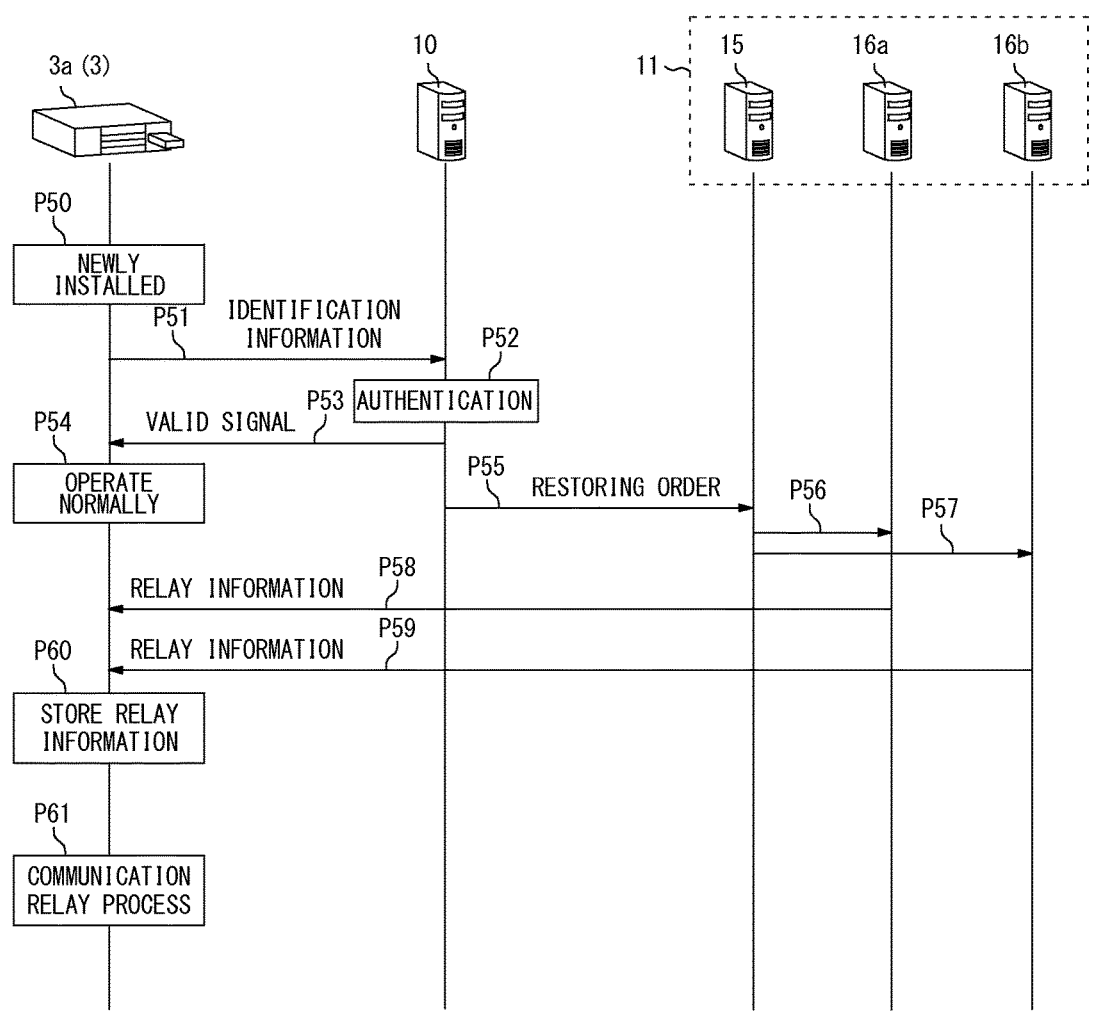
FIG. 14 is a flow diagram explaining an exemplary sequential procedure of a restoration process for the replaced communication relay device of the second preferred embodiment to obtain the relay information in the backup server and restore.

FIG. 14 is a flow diagram explaining an exemplary sequential procedure of a restoration process for the replaced communication relay device 3b to obtain the relay information 33 in the backup server 11 and restore. The communication relay device 3b is newly installed in the local environment 2 after the replacement of the communication relay device 3a (process P50). The communication relay device 3b newly installed reads and sends the identification information 31 to the license server 10 at its startup in response to being powered on (process P51). In response to receiving the identification information 31 from the communication relay device 3b, the license server 10 performs the authentication (process P52). If the received identification information 31 is registered with the license management information 48, the license server 10 sends the valid signal to the communication relay device 3b (process P53). The communication relay device 3b puts the communication relaying part 29 into operation normally (process P54). After determining that the communication relay device 3b is the new replaced device based on the replacement flag of the license management information 48, the license server 10 sends the restore order to the management server 15 (process P55). In response to receiving the restore order, the management server 15 identifies the relay information storage servers 16a and 16b each of which is storing the relay information 33 relating to the last communication relay device 3a before the replacement based on the information stored in advance, and then sends the restore order to the identified relay information storage servers 16a and 16b (process P56 and P57). In response to receiving the restore order from the management server 15, the relay information storage server 16a establishes connection with the communication relay device 3b via the platform server 13, and sends the relay information 33 stored by the last communication relay device 3a before the replacement as the backup to the replaced communication relay device 3b (process P58). As well as the relay information storage server 16b, in response to receiving the restore order from the management server 15, the relay information storage server 16b establishes connection with the communication relay device 3b via the platform server 13, and sends the relay information 33 stored by the last communication relay device 3a before the replacement as the backup to the replaced communication relay device 3b (process P59). After receiving the relay information 33, the communication relay device 3b brings the setting applying part 28 into operation to integrate the relay information 33 received from the number of different relay information storage servers 16a and 16b and store in the storage 23, thereby applying the relay information 33 used by the last communication relay device 3a to the replaced communication relay device 3b (process P60). The communication relay device 3b then refers the relay information 33 in the storage 23 to perform the process to relay the communications between the application server 12 and the image processing device 4 (process P61).

As described above, the information processing system 1 of the second preferred embodiment comprises the number of relay information storage servers 16a and 16b each of which stores the relay information 33 received from the communication relay device 3 and the management server 15 that manages the relay information storage servers 16a and 16b. The backup server 11 stores the relay information 33 received from the communication relay device 3 in the number of different relay information storage servers 16a and 16b. It is assumed that the license server 10 determines that the communication relay device 3 is replaced. In this case, the relay information restoring part 47 sends the restore order that instructs to send the relay information 33 stored in the number of different relay information storage servers 16a and 16b to the communication relay device 3 to the management server 15. In response to receiving the restore order from the relay information restoring part 47, the management server 15 controls each of the relay information storage servers 16a and 16b, thereby causing each of the relay information storage servers 16a and 16b to send the relay information 33 stored therein to the replaced communication relay device 3. Together with this, the communication relay device 3 brings the setting applying part 28 into operation to obtain the relay information 33 from the relay information storage servers 16a and 16b and store the obtained relay information 33 in the storage 23. As a result, the relay information 33 stored in the number of different relay information storage servers 16a and 16b is restored in the replaced communication relay device 3. Even when the relay information 33 used by the last communication relay device 3 is separately stored in the backup server 11, the relay information 33 before the replacement is allowed to be applied appropriately to the replaced communication relay device 3 after the communication relay device 3 is replaced according to the information processing system 1 of the second preferred embodiment.

Everything else except for the points described above in the second preferred embodiment is the same as that explained in the first preferred embodiment. The information processing system 1 of the second preferred embodiment achieves the same working-effect as the first preferred embodiment.

Third Preferred Embodiment

The third preferred embodiment of the present invention is described next. According to the first and second preferred embodiments as described above, when the communication relay device 3 in the local environment 2 is replaced, it is necessary for the administrator who manages the license of the communication relay device 3 to configures "YES" for the replacement flag of the license management information 48 in the license server 10 by manual. Also, in the local environment 2, a manual operation of removing the storage medium 9 attached to the last communication relay device 3 and attaching the removed storage medium 9 to the replaced communication relay device 3 is required. According to the third preferred embodiment, the manual operation may be reduced and the relay information 33 is applied to the replaced communication relay device 3 more effectively.

Figure 15:
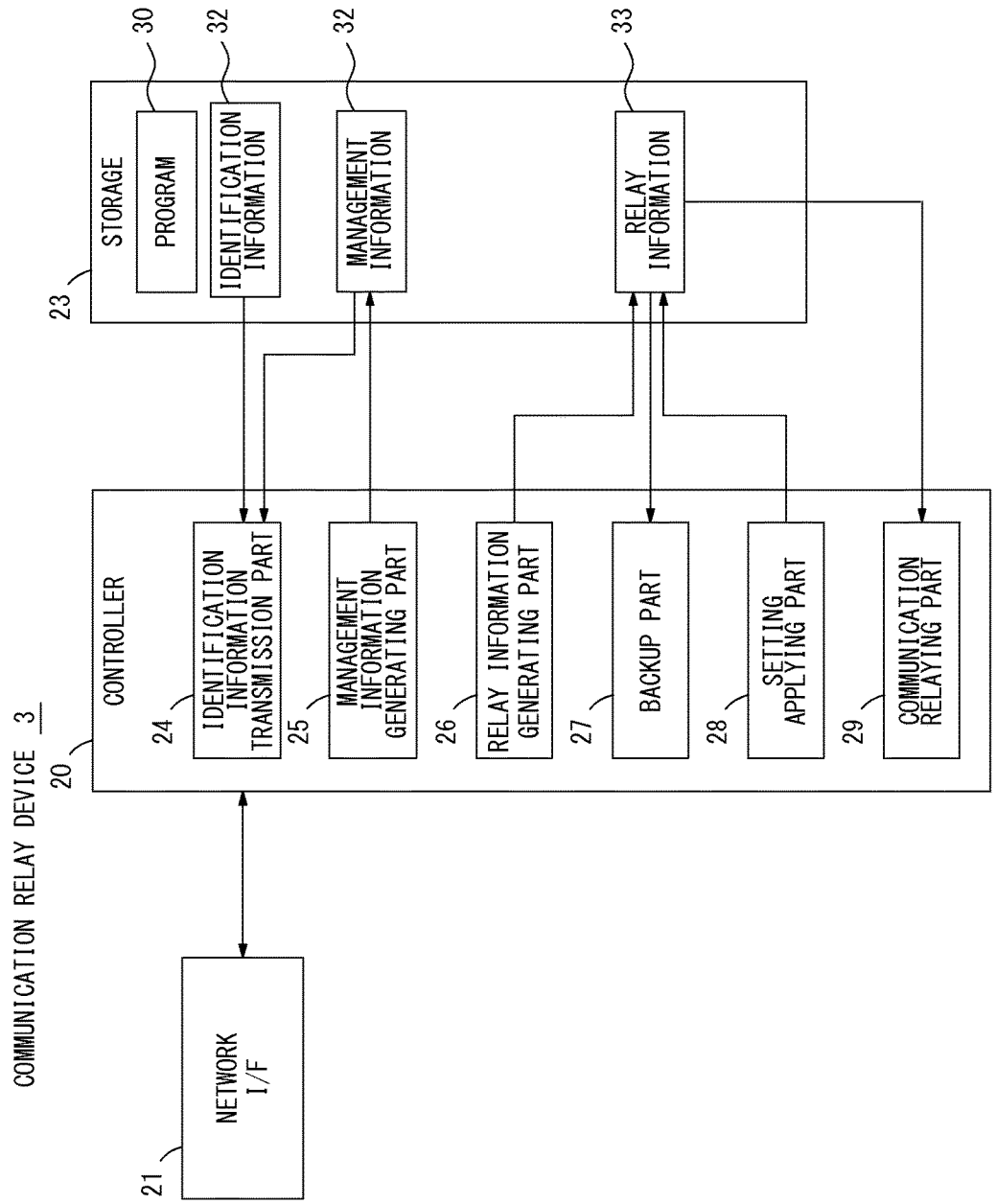
FIG. 15 is a block diagram showing an example of a hardware structure and that of a functional structure of the communication relay device of a third preferred embodiment.

FIG. 15 is a block diagram showing an example of a hardware structure and that of a functional structure of the communication relay device 3 of the third preferred embodiment. The difference between the communication relay device 3 of the third preferred embodiment and that of the first and second preferred embodiments is that the communication relay device 3 of the third preferred embodiment does not have the storage medium attachment 22 to attach the storage medium 9, and the identification information 31 is stored in the storage 23. The identification information 31 stored in the storage 23 is unique information different from the information stored in any other communication relay devices 3. The confirmation other than what explained above is the same sa the first preferred embodiment.

Figure 16:
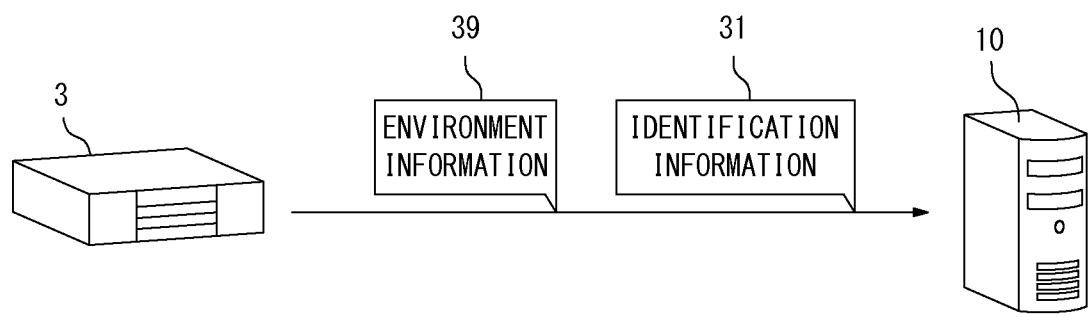
FIG. 16 shows an example of information sent from the communication relay device to the license server according to the third preferred embodiment.

The communication relay device 3 of the third preferred embodiment having the above-described configuration brings the identification information transmission part 24 into operation at its startup in response to being powered on. The identification information transmission part 24 reads the identification information 31 in the storage 23 and sends to the license server 10. At this transmission, the identification information transmission part 24 generates environment information 39 including network information relating to the local network 6 and/or relay target information. The relay target information relates to the relay target device that the communication relay device 3 itself relays the communications between which and the application server 12. The relay target device is the image processing device 4 connected to the local network 6. The network information relating to the local network 6 includes information about the network address or a default gateway of the local network 6, for instance. The relay target information relates to the relay target device includes information such as the IP address and/or the MAC address of the image processing device 4 to be the relay target device, for example. To be more specific, at sending the identification information 31, the identification information transmission part 24 brings the management information generating part 25 into operation first to identify the relay target device that the communication relay device 3 itself should relay the communications between which and the application server 12. The identification information transmission part 24 then generates the environment information 39 including the relay target information relates to the relay target device identified by the management information generating part 25. Even if the multiple communication relay devices 3 are connected to the local network 6, the relay target information included in the environment information 39 is unique to each communication relay device 3. The identification information transmission part 24 sends the environment information 39 to the license server 10 together with the identification information 31. To be more specific, when the license server 10 performs the authentication of the communication relay device 3, the communication relay device 3 sends the identification information 31 and the environment information 39 to the license server 10 as shown in FIG. 16.

After receiving the identification information 31 and the environment information 39 from the communication relay device 3, the license server 10 brings the license managing part 44 into operation if each of the received identification information 31 and environment information 39 is not registered with the license management information 48, which is new. The license managing part 44 then registers a combination of the identification information 31 and the environment information 39 received from the communication relay device 3 as the license management information 48.

FIG. 17 shows an example of the license management information 48 generated by the license managing part 44. The identification information 31 received from the communication relay device 3 and the corresponding environment information 39 received from the communication relay device 3 are associated with each other and registered as the license management information 48 of the third preferred embodiment as shown in FIG. 17. Neither the valid flag nor the replacement flag of the first preferred embodiment is assigned and configured with the license management information 48 of the third preferred embodiment.

The license managing part 44 registers a new combination of the identification information 31 and the corresponding environment information 39 as the license management information 48. In this case, the authenticating part 45 is brought into operation next, and the valid signal is sent to the communication relay device 3.

Either of the identification information 31 or the environment information 39 received from the communication relay device 3 may have already been registered with the license management information 48. In this case, the license server 10 brings the authenticating part 45 into operation. The authenticating part 45 then determines if the same combination as the one of the identification information 31 and the environment information 39 received from the communication relay device 3 is registered as the license management information 48. When the same combination is registered as the license management information 48, the authenticating part 45 sends the valid signal to the communication relay device 3.

The same combination as the one of the identification information 31 and the environment information 39 received from the communication relay device 3 may not be registered as the license management information 48. In this case, the authenticating part 45 brings the determining part 46 into operation. When the environment information 39 received from the communication relay device 3 has already been registered with the license management information 48 and the identification information 31 is not registered with the license management information 48, the determining part 46 determines that the communication relay device 3 in the local environment 2 is replaced. More specifically, it is assumed that the last communication relay device 3 before the replacement in the local environment 2 is removed from the local network 6, and the new replaced communication relay device 3 is connected to the local network 6. In this case, the identification information 31 sent from the new replaced communication relay device 3 differs from the information of the last communication relay device 3. The environment information 39, however, is the same information as the last communication relay device 3. The determining part 46, therefore, is allowed to automatically determine if the communication relay device 3 in the local environment 2 is replaced to the new one based on the information received from the communication relay device 3.

After the determining part 46 determines that the communication relay device 3 is replaced, the license server 10 brings the relay information restoring part 47 into operation. The relay information restoring part 47 controls the process to restore the relay information 33 stored in the backup server 11 by the last communication relay device 3 into the replaced communication relay device 3. It is assumed, for example, the relay information 33 from the last communication relay device 3 is stored in the number of different relay information storage servers 16a and 16b. Even in this case, if the control explained in the second preferred embodiment is conducted, the relay information 33 is allowed to be restored normally in the replaced communication relay device 3.

FIG. 18 is a flow diagram explaining an exemplary sequential procedure of the process performed at the communication relay device 3 of the third preferred embodiment. The communication relay device 3 performs the startup process in response to being powered on (step S40). After the startup, the communication relay device 3 obtains the network information relating to the local network 6 (step S41). The communication relay device 3 brings the management information generating part 25 into operation to generate the management information 32 (step S42). The management information 32 includes the relay target information that should be sent to the license server 10. The communication relay device 3 reads the identification information 31 in the storage 23 (step S43), and sends the read identification information 31 and the environment information 39 to the license server 10 (step S44). The communication relay device 3 then performs the process after step S45. The process after step S45 is the same as the process after step S23 in FIG. 11. Hence, the detailed explanation is not given here.

FIG. 19 is a flow diagram explaining an exemplary sequential procedure of the process performed at the license server 10 of the third preferred embodiment. Upon the start of the process, the license server 10 is put into a standby state until receiving the identification information 31 and the environment information 39 from the communication relay device 3 (step S60). After receiving the identification information 31 and the environment information 39 (when a result of step S60 is YES), the license server 10 determines if the same combination as the one of the received identification information 31 and environment information 39 has already been registered as the license management information 48 (step S61). The same combination may be registered as the license management information 48 (when a result of step S61 is YES). In this case, the license server 10 sends the valid signal to the communication relay device 3 (step S62).

The same combination of the received identification information 31 and environment information 39 may not be registered as the license management information 48 (when a result of step S61 is NO). In this case, the license server 10 determines if the same information as the received environment information 39 has already been registered as the license management information 48 (step S63). The same information as the received environment information 39 may be registered as the license management information 48 (when a result of step S63 is YES). In this case, the license server 10 determines that the communication relay device 3 is replaced (step S64). The license server 10 then sends the valid signal to the communication relay device 3 (step S65), and sends the restore order to the backup server 11 (step S66). Thus, the relay information 33 stored in the backup server 11 by the last communication relay device 3 before the replacement is sent to the replaced communication relay device 3. As a result, the relay information 33 may be immediately restored. The license server 10 then rewrites the identification information 31 registered with the license management information 48 to the received identification information 31, thereby updating the license management information 48 (step S67).

The same information as the received environment information 39 may not be registered as the license management information 48 (when a result of step S63 is NO). In this case, the license server 10 determines if the received identification information 31 is the registered information (step S68). If the received identification information 31 is the registered information (when a result of step S68 is YES), the license server 10 sends the valid signal to the communication relay device 3 (step S69). The license server 10 then additionally registers the combination of the received identification information 31 and environment information 39 as the license management information 48 (step S69). If the received identification information 31 is not the registered information (when a result of step S68 is NO), the license server 10 completes the process without sending the valid signal because it considers as an unauthorized access.

As performing the above-described process, the license server 10 is allowed to automatically determine whether or not the communication relay device 3 is replaced based on the information received from the communication relay device 3. It is unnecessary for the administrator who manages the license of the communication relay device 3 to configure in advance "YES" for the replacement flag of the license management information 48 in the license server 10 by manual. Also, in the local environment 2, a manual operation of removing the storage medium 9 attached to the last communication relay device 3 and attaching the replaced storage medium 9 to the replaced communication relay device 3 is not required. On the information processing system 1 of the third preferred embodiment, the manual operation may be reduced for the replacement of the communication relay device 3 in the local environment 2.

Everything else except for the points described above in the third preferred embodiment is the same as those explained in the first and the second preferred embodiments. The information processing system 1 of the third preferred embodiment achieves the same working-effects as the first and the second preferred embodiments.

(Modifications)

While the preferred embodiments of the present invention have been described above, the present invention is not limited to the preferred embodiments. Various modifications may be applied to the present invention.

According to the above-described first, second and third preferred embodiments, the license server 10, the backup server 11, the application server 12 and the platform server 13 are installed on the cloud 7 on the internet. However, this is given not for limitation. More specifically, the servers only have to be installed on the network different from the local network 6 to which the communication relay device 3 and the image processing device 4 are connected.

According to the above-described first, second and third preferred embodiments, the communication relay device 3 is replaced if any trouble happens to the communication relay device 3. The communication relay device 3 may be replaced because of any other reason. It is assumed, for example, a new model of the communication relay device 3 is released. In this case, the communication relay device 3 in the local environment 2 may be replaced to the new model even though there is no trouble with the communication relay device 3. Even in such cases, the technique described in each of the above first, second and third preferred embodiments allows the relay information 33 before the replacement immediately applied to the replaced communication relay device 3.

What is claimed is:

1. An information processing system comprising:
   an image processing device connected to a network;
   an application server that provides with an application service for cooperation with said image processing device over said network;
   a communication relay device that relays communications over said network between said image processing device and said application server;
   a license server connected to said network, said license server managing said communication relay device; and
   a backup server that stores therein information received over said network as a backup, wherein
   said communication relay device includes:
     a relay information generating part that generates relay information to relay the communications between said image processing device and said application server;
     a storage part in which the relay information generated by said relay information generating part is stored;
     a communication relaying part that relays the communications between said image processing device and said application server based on the relay information in said storage part;
     a backup part that sends the relay information in said storage part to said backup server at a predetermined timing;
     an identification information transmission part that reads identification information stored in a predetermined storage medium and sends the read identification information to said license server; and
     a setting applying part that obtains the relay information from said backup server and stores the obtained relay information in said storage part in response to receiving a valid signal from said license server as the relay information is not stored in said storage part after said identification information transmission part sends said identification information, and
   said license server includes:
     a license managing part that manages license management information, the identification information of said communication relay device being registered as said license management information;
     a determining part that determines whether or not said communication relay device is replaced based on said license management information when the identification information is received from said communication relay device; and
     a relay information restoring part that sends said valid signal to said communication relay device and causes said backup server to send the relay information stored in said backup server to said communication relay device when said determining part determines that said communication relay device is replaced.

2. The information processing system according to claim 1, wherein
   said backup server includes a number of relay information storage servers and a management server that manages said number of relay information storage servers, the relay information sent from said communication relay device being stored in said number of different relay information storage servers,
   said relay information restoring part instructs said management server to send the relay information stored in said number of different relay information storage servers to said communication relay device when said determining part determines that said communication relay device is replaced,
   said management server causes said number of relay information storage servers to send the relay information stored in said number of different relay information storage servers to said communication relay device based on the instruction from said relay information restoring part, and
   said setting applying part obtains the relay information received from said number of relay information storage servers and stores in said storage part.

3. The information processing system according to claim 1, wherein
   said license managing part adds replacement target identification information to the identification information of said communication relay device which is to be replaced and registers with said license management information, and
   said determining part determines that said communication relay device is replaced if said replacement target identification information is added to the identification information received from said communication relay device after referring to said license management information when the identification information is received from said communication relay device.

4. The information processing system according to claim 3, wherein
   said communication relay device further includes a storage medium attaching part to which said storage medium is attached and removed, and
   said identification information transmission part reads the identification information in said storage medium attached to said storage medium attaching part and sends the read identification information to said license server.

5. The information processing system according to claim 1, wherein
   said identification information transmission part obtains environment information relating to said network or said image processing device and sends to said license server when sending the identification information read from said storage medium to said license server,
   said license managing part registers a combination of the identification information and the environment information received from said communication relay device as said license management information, and if the received identification information differs from what registered as said license management information and the environment information is the same as that registered as said license management information when the identification information and the environment information are received from said communication relay device, said determining part determines that said communication relay device is replaced.

6. A license server that manages a communication relay device on an information processing system comprising an image processing device connected to a network; an application server providing over said network with an application service for cooperation with said image processing device; a communication relay device relaying communications between said image processing device and said application server over said network; and a backup server in which relay information received from said communication relay device over said network is stored as a backup, said license server comprising:

a license managing part that manages license management information, identification information of said communication relay device being registered as said license management information;

a determining part that determines whether or not said communication relay device is replaced based on said license management information when the identification information is received from said communication relay device; and a relay information restoring part that restores the relay information stored in said backup server into said communication relay device when said determining part determines that said communication relay device is replaced.

7. The license server according to claim 6, wherein said relay information restoring part causes said backup server to send the relay information distributed and stored in said backup server to said communication relay device when the relay information is distributed and stored in said backup server.

8. The license server according to claim 6, wherein said license managing part adds replacement target identification information to the identification information of said communication relay device which is to be replaced and registers with said license management information, and said determining part determines that said communication relay device is replaced if said replacement target identification information is added to the identification information received from said communication relay device after referring to said license management information when the identification information is received from said communication relay device.

9. The license server according to claim 6, wherein said license managing part registers a combination of the identification information and environment information received from said communication relay device as said license management information, and if the received identification information differs from what registered as said license management information and the environment information is the same as that registered as said license management information when the identification information and the environment information are received from said communication relay device, said determining part determines that said communication relay device is replaced.

10. A communication relay device relaying communications over a network between an image processing device and an application server, comprising:

a relay information generating part that generates relay information to relay the communications between said image processing device and said application server;

a storage part in which the relay information generated by said relay information generating part is stored;

a communication relaying part that relays the communications between said image processing device and said application server based on the relay information in said storage part;

a backup part that sends the relay information in said storage part to a backup server connected to said network at a predetermined timing;

an identification information transmission part that reads identification information stored in a predetermined storage medium and sends the read identification information to a license server connected to said network; and a setting applying part that obtains the relay information from said backup server and stores the obtained relay information in said storage part in response to receiving a valid signal from said license server as the relay information is not stored in said storage part after said identification information transmission part sends said identification information.

11. The communication relay device according to claim 10, further comprising:

a management information generating part that generates and manages management information, information relating to said image processing device which is a relay target device of the communications with said application server being registered as the management information.

12. The communication relay device according to claim 10, wherein said setting applying part obtains the relay information stored in a number of different relay information storage servers included in said backup server and stores the obtained relay information in said storage part after receiving said valid signal from said license server as the relay information is not stored in said storage part.

13. The communication relay device according to claim 10, further comprising:

a storage medium attaching part to which said storage medium is attached and removed, wherein said identification information transmission part reads the identification information in said storage medium attached to said storage medium attaching part and sends the read identification information to said license server.

14. The communication relay device according to claim 10, wherein said identification information transmission part obtains environment information relating to said network or said image processing device and sends to said license server when sending the identification information read from said storage medium to said license server.

15. A non-transitory computer readable recording medium storing a program to be executed by a license server that manages a communication relay device on an information processing system comprising an image processing device connected to a network; an application server providing over said network with an application service for cooperation with said image processing device; a communication relay device relaying communications between said image processing device and said application server over said network; and a backup server in which relay information received from said communication relay device over said network is stored as a backup, execution of the program by said license server causing said license server to execute the steps of:
- (a) managing license management information, identification information of said communication relay device being registered as said license management information;
- (b) determining whether or not said communication relay device is replaced based on said license management information when the identification information is received from said communication relay device; and
- (c) restoring the relay information stored in the backup server into said communication relay device when said communication relay device is determined to be replaced in said step (b).

16. The non-transitory computer readable recording medium according to claim 15, wherein
said backup server is caused to send the relay information distributed and stored in said backup server to said communication relay device in said step (c) when the relay information is distributed and stored in said backup server.

17. The non-transitory computer readable recording medium according to claim 15, wherein
replacement target identification information is added to the identification information of said communication relay device which is to be replaced and is registered with said license management information in said step (a), and
said communication relay device is determined to be replaced in said step (b) if said replacement target identification information is added to the identification information received from said communication relay device after referring to said license management information when the identification information is received from said communication relay device.

18. The non-transitory computer readable recording medium according to claim 15, wherein
a combination of the identification information and environment information received from said communication relay device is registered as said license management information in said step (a), and
if the received identification information differs from what registered as said license management information and the environment information is the same as that registered as said license management information when the identification information and the environment information are received from said communication relay device, said communication relay device is determined to be replaced in said step (b).

19. A non-transitory computer readable recording medium storing a program to be executed by a communication relay device relaying communications over a network between an image processing device and an application server, execution of the program by said communication relay device causing said communication relay device to execute the steps of:
- (a) generating relay information to relay the communications between said image processing device and said application server, and storing the generated relay information in a predetermined storage part;
- (b) relaying the communications between said image processing device and said application server based on the relay information in said storage part;
- (c) sending the relay information in said storage part to a backup server connected to said network at a predetermined timing;
- (d) reading identification information stored in a predetermined storage medium and sending the read identification information to a license server connected to said network; and
- (e) obtaining the relay information from said backup server and storing the obtained relay information in said storage part in response to receiving a valid signal from said license server as the relay information is not stored in said storage part after said identification information is sent in said step (d).

20. The non-transitory computer readable recording medium according to claim 19, execution of the program by said communication relay device causing said communication relay device to execute the further step of:
- (f) generating and managing management information, information relating to said image processing device which is a relay target device of the communications with said application server being registered as the management information.

21. The non-transitory computer readable recording medium according to claim 19, wherein
the relay information stored in a number of different relay information storage servers included in said backup server is obtained, and the obtained relay information is stored in said storage part in said step (e) after said valid signal is received from said license server as the relay information is not stored in said storage part.

22. The non-transitory computer readable recording medium according to claim 19, wherein
said communication relay device includes a storage medium attaching part to which said storage medium is attached and removed, and
the identification information in said storage medium attached to said storage medium attaching part is read, and the read identification information is sent to said license server in said step (d).

23. The non-transitory computer readable recording medium according to claim 19, wherein
environment information relating to said network or said image processing device is obtained and sent to said license server in said step (d) when the identification information read from said storage medium is sent to said license server.

24. A data restoration method for a replacement of a communication relay device on an information processing system comprising: an image processing device connected to a network; an application server providing with an application service that requires cooperation with said image processing device over said network; a communication relay device relaying communications over said network between said image processing device and said application server; a license server connected to said network, managing said communication relay server; and a backup part storing therein information received over said network as a backup, said data restoration method comprising the steps of:
generating license management information at said license server, identification information of said communication relay device being registered as said license management information;
generating relay information to relay the communications between said image processing device and said application server and storing the generated relay information in a predetermined storage part at said communication relay device;

relaying the communications between said image processing device and said application server based on the relay information in said storage part at said communication relay device;

sending the relay information in said storage part to said backup server at a predetermined timing from said communication relay device;

reading the identification information stored in a predetermined storage medium at said communication relay device and sending the read identification information to said license server after a replacement of said communication relay device;

determining whether or not said communication relay device is replaced based on said license management information at said license server when the identification information is received from said communication relay device;

sending a valid signal to said communication relay device and causing said backup server to send the relay information stored in said backup server to said communication relay device when said license server determines that said communication relay device is replaced; and obtaining the relay information from said backup server and storing the obtained relay information in said storage part in response to receiving said valid signal from said license server as the relay information is not stored in said storage part after said communication relay device sends said identification information.

* * * * *